United States Patent
Sato

(10) Patent No.: US 7,058,380 B2
(45) Date of Patent: *Jun. 6, 2006

(54) MULTIBAND RADIO SIGNAL TRANSMITTER/RECEIVER

(75) Inventor: Naotaka Sato, Tokyo (JP)

(73) Assignee: Sony Corporation, Tokyo (JP)

(*) Notice: Subject to any disclaimer, the term of this patent is extended or adjusted under 35 U.S.C. 154(b) by 192 days.

This patent is subject to a terminal disclaimer.

(21) Appl. No.: 10/250,720

(22) PCT Filed: Dec. 26, 2001

(86) PCT No.: PCT/JP01/11469

§ 371 (c)(1),
(2), (4) Date: Dec. 29, 2003

(87) PCT Pub. No.: WO02/056491

PCT Pub. Date: Jul. 18, 2002

(65) Prior Publication Data

US 2004/0097210 A1 May 20, 2004

(30) Foreign Application Priority Data

Jan. 9, 2001 (JP) ................................. 2001-001283

(51) Int. Cl.
*H04B 1/06* (2006.01)

(52) U.S. Cl. ............... 455/260; 455/552.1; 455/553.1; 455/208

(58) Field of Classification Search ............. 455/552.1, 455/553.1, 84, 260, 208, 73, 180.1, 255, 455/141

See application file for complete search history.

(56) References Cited

U.S. PATENT DOCUMENTS

| 5,179,360 | A | * | 1/1993 | Suzuki ..................... 332/103 |
| 5,771,442 | A | * | 6/1998 | Wang et al. ................. 455/93 |
| 5,812,605 | A | * | 9/1998 | Smith et al. ................ 375/308 |
| 5,844,868 | A | | 12/1998 | Takahashi et al. ............. 369/6 |
| 6,175,746 | B1 | * | 1/2001 | Nakayama et al. ....... 455/552.1 |
| 6,269,253 | B1 | * | 7/2001 | Maegawa et al. ......... 455/552.1 |
| 6,484,013 | B1 | * | 11/2002 | Ishii ........................... 455/73 |
| 6,609,010 | B1 | * | 8/2003 | Dolle et al. .............. 455/552.1 |
| 6,735,426 | B1 | * | 5/2004 | Pau ............................ 455/255 |

* cited by examiner

*Primary Examiner*—Nay Maung
*Assistant Examiner*—Edan Orgad
(74) *Attorney, Agent, or Firm*—Frommer Lawrence & Haug LLP; William S. Frommer

(57) ABSTRACT

It is possible to achieve the miniaturization and the power saving of a hardware circuit as a multi-band radio signal transmitter/receiver, which can carry out a communication through a signal of a first communication method of transmitting and receiving a signal modulated by using information with regard only to a phase, for example, GSM/DCS, and a signal of a second communication method of transmitting and receiving a signal modulated by using an information of a phase and an amplitude, for example, UMTS (W-CDMA). A signal of PLL for a different reception channel is used as a local oscillation signal for a direct conversion reception, by using an image removing mixer or a reproduction dividing circuit, in each of GSM/DCS and UMTS modes, by switching a frequency of PLL in a transmitting IF signal in GSM/DCS/UMTS for each method, in order to generate a receiving signal used in GSM/DCS/UMTS.

10 Claims, 13 Drawing Sheets

MULTIBAND RADIO SIGNAL TRANSMITTER/RECEIVER

TECHNICAL FIELD

The present invention relates to a multi-band radio signal electronic transmitter/receiver that can carry out a communication, for example, based on two kinds of different communication methods of a TDMA method and a W-CDMA method and can carry out a communication of signals in two or more frequency bands different from each other.

BACKGROUND ART

GSM is a portable telephone system in Europe, and DCS is a personal mobile communications system in Europe. Both of them use a TDMA (Time Division Multiple Access) system. Also, as a modulation method, they use a Gaussian filter for a transmission baseband filter and use GMSK (Gaussian-filtered Minimum Shift Keying) that is a narrow band MSK (Minimum Shift Keying) in which a band is limited. However, each system employs a different frequency band.

FIG. 1 shows a configuration of a conventional GSM terminal device 200. This GSM terminal device 200 processes a transmission/reception signal in a 900 MHz band. On the contrary, a device that processes a transmission reception signal in an 1800 MHz band is a DCS terminal device. Both of them have the substantially similar configurations.

At first, a transmitting system 200T of FIG. 1 is explained. A transmission data generated in a data generating unit (not shown) is sent to a baseband processing unit 201. The baseband processing unit 201 performs a phase modulating process on the transmission data, generates an I signal and a Q signal, which are orthogonal to each other, and sends to a quadrature modulation unit 202. In the quadrature modulation unit 202, the I signal and the Q signal, which are inputted thereto, are mixed with an intermediate frequency signal (hereafter, referred to as an IF signal) generated by a fixed PLL (Phase Locked Loop) circuit 203, respectively, and synthesized and then sent to an offset PLL circuit unit 204.

The offset PLL circuit unit 204 generates an RF signal (Radio Frequency signal) in a 900 MHz band that is orthogonally modulated. At this time, the offset PLL circuit unit 204 is a frequency synthesizer for offset PLL, and a signal is sent thereto from a channel PLL circuit unit 209 for generating a receiving local oscillation signal, which will be described later.

The RF signal generated by the offset PLL circuit unit 204 is amplified at a predetermined gain by a constant gain amplifier 205, and then amplified by a power amplifier 206, and further radiated through an antenna switch 207 from an antenna 208 to air.

A receiving system 200R will be described below. The RF signal transmitted from a base station is received through the antenna 208 and the antenna switch 207, and sent to a band pass filter 211 and filtered. A filtering output of the band pass filter 211 is amplified by a low noise amplifier 212, and then sent to a quadrature demodulation unit 213.

The quadrature demodulation unit 213 demodulates the I signal and the Q signal, which are the baseband signals, from the amplification output from the low noise amplifier 212. At this time, the quadrature demodulation unit 213 receives the receiving local oscillation signal, which is used for the demodulation, from the channel PLL circuit unit 209.

Next, portions including the quadrature modulation unit 202, the fixed PLL circuit unit 203, the offset PLL circuit unit 204 and the channel PLL circuit unit 209 in FIG. 1 will be described in detail with reference to FIG. 2.

The fixed PLL circuit unit 203 includes a VCO (Voltage Controlled Oscillator) 221, a fixed PLL controlling unit 222 and a low pass filter 223, and generates an intermediate frequency signal of 760 MHz, and sends to a quadrature modulation unit 222.

The quadrature modulation unit includes a divider 224, mixers 225, 226 and an adder 227. The divider 224 divides the intermediate frequency signal of 760 MHz from the fixed PLL circuit unit 203 into halves, and makes into intermediate frequency signals of 380 MHz of two phases different from each other by 90 degrees, and then sends to the mixer 225 and the mixer 226.

The mixers 225 and 226 mix the I signal and the Q signal with the intermediate frequency signals of 380 MHz of the two phases whose phases are different by 90 degrees, respectively. Then, in the quadrature modulation unit 202, outputs of the mixers 225 and 226 are added by the adder 227 and sent to the offset PLL circuit unit 204.

The offset PLL circuit unit 204 includes a VCO 228, a mixer 229, a low pass filter 230, a phase comparator 231 and a low pass filter 232. Also, the channel PLL circuit unit 209 includes a VCO 233, a channel PLL 234 and a low pass filter 235.

The channel PLL circuit unit 209 generates a signal of a suitable frequency at a time of transmission from the VCO 233 or at a time of reception, in coincidence with a frequency of a channel used by the GSM terminal device 200. In the case of this example, at the time of the transmission, it generates a transmission signal of 1260 to 1295 MHz, and sends to the offset PLL circuit unit 204. Also, at the time of the reception, it generates an oscillation frequency signal of 1387.5 to 1440 MHz, which is outputted as a receiving local oscillation signal from an output terminal 236.

In the offset PLL circuit unit 204, at the time of the transmission, an oscillation output signal of the VCO 228 and a transmission frequency signal for a channel to be used from the channel PLL circuit unit 209 are mixed by the mixer 229, and its mixed output is sent through the low pass filter 230 to the phase comparator 231. The phase comparator 231 sends the phase comparison output between the output from the low pass filter 230 and the output from the quadrature modulation unit 202, through the low pass filter 232 to the VCO 228, and a frequency of an output oscillation signal from this VCO 228 is controlled.

Accordingly, an oscillation frequency of the VCO 228 is converged so as to be equal to a value obtained by the following calculation: (the oscillation frequency of the VCO 233)−{(the oscillation frequency of the VCO 221)/2}. The IF signal of 380 MHz from the quadrature modulation unit 202, which is inputted to the phase comparator 228, has the phase information for the I signal and the Q signal. Thus, the output signal of the VCO 228 is also phase-modulated by the I signal and the Q signal. That is, as the output of the VCO 228, the transmission signal of the GSM is GMSK-modulated and directly obtained.

The circuit for the transmission signal generation using the offset PLL circuit unit 204 as mentioned above can be attained by a fact that the GMSK modulation is the modulating method using the information of only the phase.

By the way, recently, a technique of CDMA (Code Division Multiple Access) or W-CDMA (Wideband Code Division Multiple Access) being a leading system as a next generation of a mobile communication system has been remarked. In this specification description, the communication method employing the W-CDMA system and the like is assumed to be a UMTS (Universal Mobile Telecommunication System) system.

In the case of the UMTS (Universal Mobile Telecommunication System) system, as the modulating method, it does not use the modulating method through the information of only the phase such as the GMSK, and it uses HPSK that is the modulating method using even information of an amplitude and the like.

From the background that there are the plurality of communication methods and the plurality of communication service frequency bands, as described above, a multi-band radio signal transmitter/receiver has been desired which can be used as a multi-band system based on two kinds of communication methods including the function of the GSM terminal device and the function of the DCS terminal device as mentioned above and even the function of the W-CDMA terminal device.

However, the W-CDMA employs the modulating method such as HPSK and the like. Thus, if a multi-band system terminal including therein the above-mentioned GSM terminal device 200 is considered, the transmission signal orthogonally modulated by the above-mentioned offset PLL circuit unit 204 can not be generated. This is because the QPSK, the HPSK and the like have the information of amplitude components. In the output signal of the VCO 228 of FIG. 2, it is evident that correspondingly to an output voltage level of the phase comparator 231, only its phase component is changed, and the change in the amplitude is not induced at all.

FIG. 3 shows a circuit diagram of a PLL system added as the W-CDMA system of the UMTS system, in the case where the multi-band radio signal transmitter/receiver is considered.

This PLL system circuit includes a quadrature modulation unit 240, a channel PLL circuit unit 241 that is a PLL synthesizer for generating an RF signal of a transmission frequency for this quadrature modulation unit 240 and a fixed PLL circuit unit 242, in a PLL configuration for a typical direct modulation.

Also, this PLL system circuit has: a mixer 243 for mixing a signal of a transmission frequency of a channel to be used from the channel PLL circuit unit 241 and an output signal from the fixed PLL circuit unit 242, and for generating a signal for a receiving local oscillation frequency; and a band pass filter 244 for limiting a band of its mixed output and extracting and outputting the signal for the receiving local oscillation frequency.

The channel PLL circuit unit 241 includes a VCO 251, a channel PLL controlling unit 252 and a low pass filter 253, and generates an RF signal of a transmission signal frequency fTX that is sent to the quadrature modulation unit 240.

The quadrature modulation unit 240 includes a mixer 254 and a mixer 255, an adder 256 and a π/2 phase shift circuit 257. The RF signal from the channel PLL circuit unit 241 is phase-shifted by the π/2 phase shift circuit 257 and sent to the mixer 254, and the RF signal whose phase is not shifted is sent to the mixer 255. Also, an I signal and a Q signal from a baseband processing unit 203 are inputted to the mixer 254 and the mixer 255, and the above-mentioned RF signals are orthogonally modulated. Respective outputs of the mixer 254 and the mixer 255 are synthesized by the adder 256 and outputted as a transmission signal from an output terminal 258.

The fixed PLL circuit unit 242 includes a VCO 261, a fixed PLL controlling unit 262 and a low pass filter 263, generates a fixed frequency signal fFIX, and sends to the mixer 243.

The mixer 243 mixes the above-mentioned fixed frequency signal fFIX with the signal frequency fTX from the above-mentioned channel PLL circuit unit 241. Then, the band pass filter 244 extracts a frequency fL0 (=fTX+fFIX) of a sum of an oscillation frequency of the VCO 251 and an oscillation frequency of the VCO 261. This is outputted as the receiving local oscillation frequency fL0 from the output terminal 245.

In a small portable wireless terminal, in order to miniaturize a circuit scale of a wireless unit, the employment of the above-mentioned direct conversion (DCR) method contributes to the miniaturization and the lighter weight. Thus, if the DCR method is used in the portable terminal of the multi-band communication system that can correspond to different two communication methods selected from systems such as GSM/DCS/UMTS and the like and the different frequency bands, it can be expected to largely contribute to the miniaturization and the lighter weight.

However, as mentioned above, in the multi-band radio signal transmitter/receiver that corresponds to the W-CDMA system and the GSM/DCS system, namely, in the circuit in which the PLL system circuit in FIG. 2 and the PLL system circuit in FIG. 3 are combined, the PLL circuit containing the VCO is doubled. Thus, its scale becomes enormous in designing the circuit and making into an IC.

The purpose of the present invention is to provide a multi-band radio signal transmitter/receiver that can achieve a miniaturization of a hardware circuit and a saving of an electric power, in view of the above-mentioned problems.

DISCLOSURE OF THE INVENTION

A multi-band radio signal transmitter/receiver according to the present invention is a multi-band radio signal transmitter/receiver, which can carry out a communication through a signal of a first communication method of transmitting and receiving a signal modulated by using an information of only a phase and through a signal of a second communication method of transmitting and receiving a signal modulated by using an information of a phase and an amplitude and can also carry out a communication in a plurality of different frequency bands, which is characterized by including:

first frequency signal generating means, which generates a signal of a fixed frequency that is different between a case of the above-mentioned first communication method and a case of the above-mentioned second communication method;

second frequency signal generating means, which generates a signal of a frequency corresponding to a communication channel to be used, with regard to a communication method and a frequency band that are selected from the above-mentioned first communication method, the above-mentioned second communication method and the above-mentioned plurality of frequency bands, wherein the above-mentioned signal is a transmitting/receiving reference oscillation signal that is used to generate a receiving local oscillation signal for demodulating a reception signal based on the above-mentioned first communication method or a reception signal based on the above-mentioned second communication method for each communication method and is also used to generate a transmission signal based on the above-mentioned first communication method or a transmission signal based on the above-mentioned second communication method;

first communication method modulating means for generating a modulation signal in which a transmitting baseband signal is modulated by using a signal of a fixed frequency for the above-mentioned first communication method from the above-mentioned first frequency signal generating means, as a modulating reference signal, when the transmission signal of the above-mentioned first communication method is generated;

amplifying means for amplifying a signal of a fixed frequency for the above-mentioned second communication method from the above-mentioned first frequency signal generating means, when the transmission signal of the above-mentioned second communication method is generated; and transmitting signal generating means for generating a modulating reference signal, which when generating the transmission signal of the above-mentioned first communication method, phase-compares the above-mentioned modulation signal from the above-mentioned first communication method modulating means with the above-mentioned transmitting/receiving reference oscillation signal from the above-mentioned second frequency signal generating means, controls a variable frequency oscillator based on its phase comparison output and thereby generates a modulation transmission signal, and when generating the transmission signal of the above-mentioned second communication method, phase-compares the above-mentioned amplified signal of the fixed frequency for the above-mentioned second communication method from the above-mentioned amplifying unit with the above-mentioned transmitting/receiving reference oscillation signal from the above-mentioned second frequency signal generating means, and based on its phase comparison output, generates a modulation transmission signal of the above-mentioned second communication method.

In the multi-band radio signal transmitter/receiver having the above-mentioned configuration, in a case of a transmission of a radio signal of the first communication method, the first communication method modulating means modulates the transmitting baseband signal based on the signal of the fixed frequency for the first communication method from the first frequency signal generating means, and phase-compares its modulation signal with the transmitting/receiving reference oscillation signal from the second frequency signal generating means, and then controls the variable frequency oscillator based on its phase comparison output, and thereby generates the modulation transmission signal.

Also, in a case of a reception of a radio signal of the first communication method, the demodulation can be carried out by orthogonally demodulating the reception signal, on the basis of the receiving local oscillation signal generated in accordance with the transmitting/receiving reference oscillation signal from the second frequency signal generating means.

Also, in a case of a transmission of a radio signal of the second communication method, the amplifying unit amplifies the signal of the fixed frequency for the second communication method from the first frequency signal generating means. Then, the transmitting signal generating means phase-compares the amplified signal of the fixed frequency for the second communication method from the amplifying means, and generates the modulating reference signal for generating the modulation transmission signal of the second communication method, based on its phase comparison output.

Then, the transmitting baseband signal is modulated on the basis of the modulating reference signal, and the modulation transmission signal of the second communication method is generated.

In a case of a reception of a radio signal of the second communication method, the demodulation can be carried out by orthogonally demodulating the reception signal, with the transmitting/receiving reference oscillation signal from the second frequency signal generating means as the receiving local oscillation signal.

BEST MODE FOR CARRYING OUT INVENTION

An embodiment of a multi-band radio signal transmitter/receiver according to the present invention will be described below with reference to FIG. 4.

[Entire Configuration of Multi-Band Radio Signal Transmitter/Receiver in First Embodiment]

Figure 1:
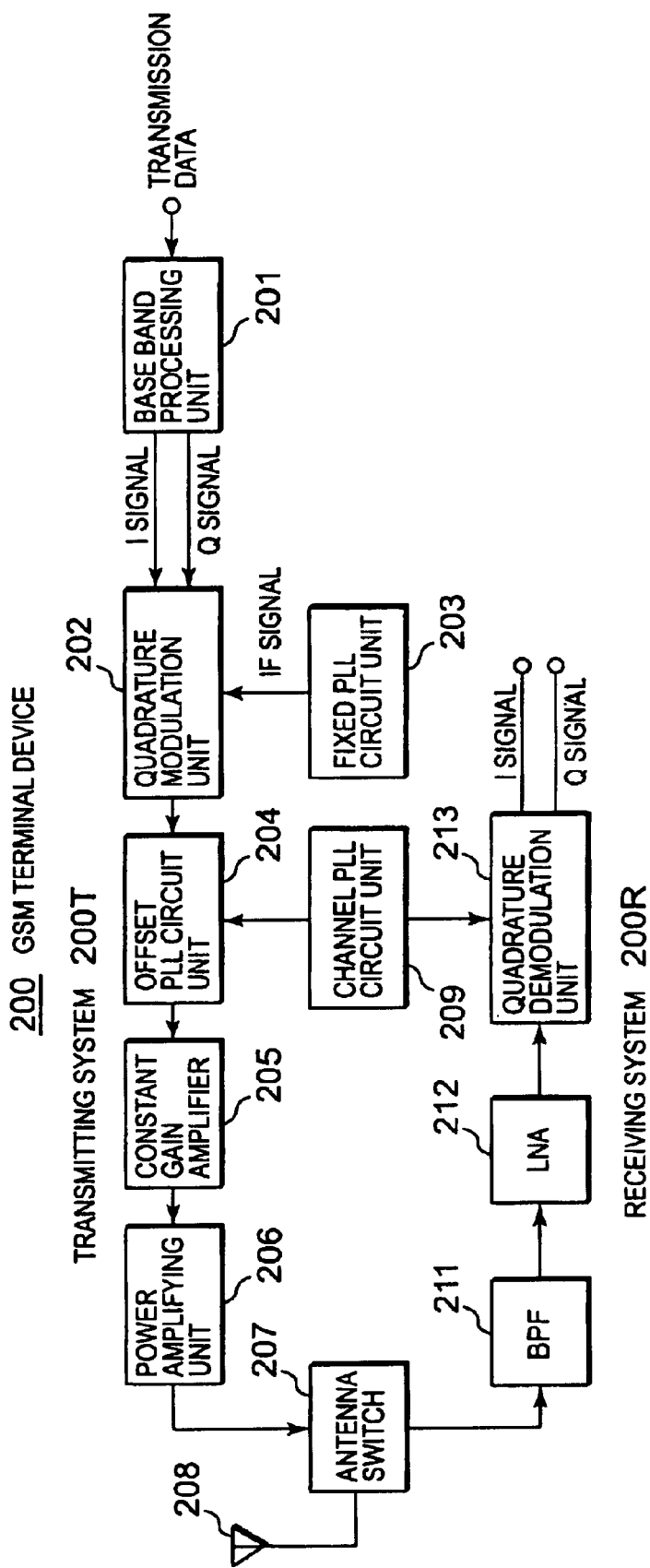
FIG. 1 is a block diagram showing a configuration example of a transmitting/receiving terminal device for a GSM system.
Figure 2:
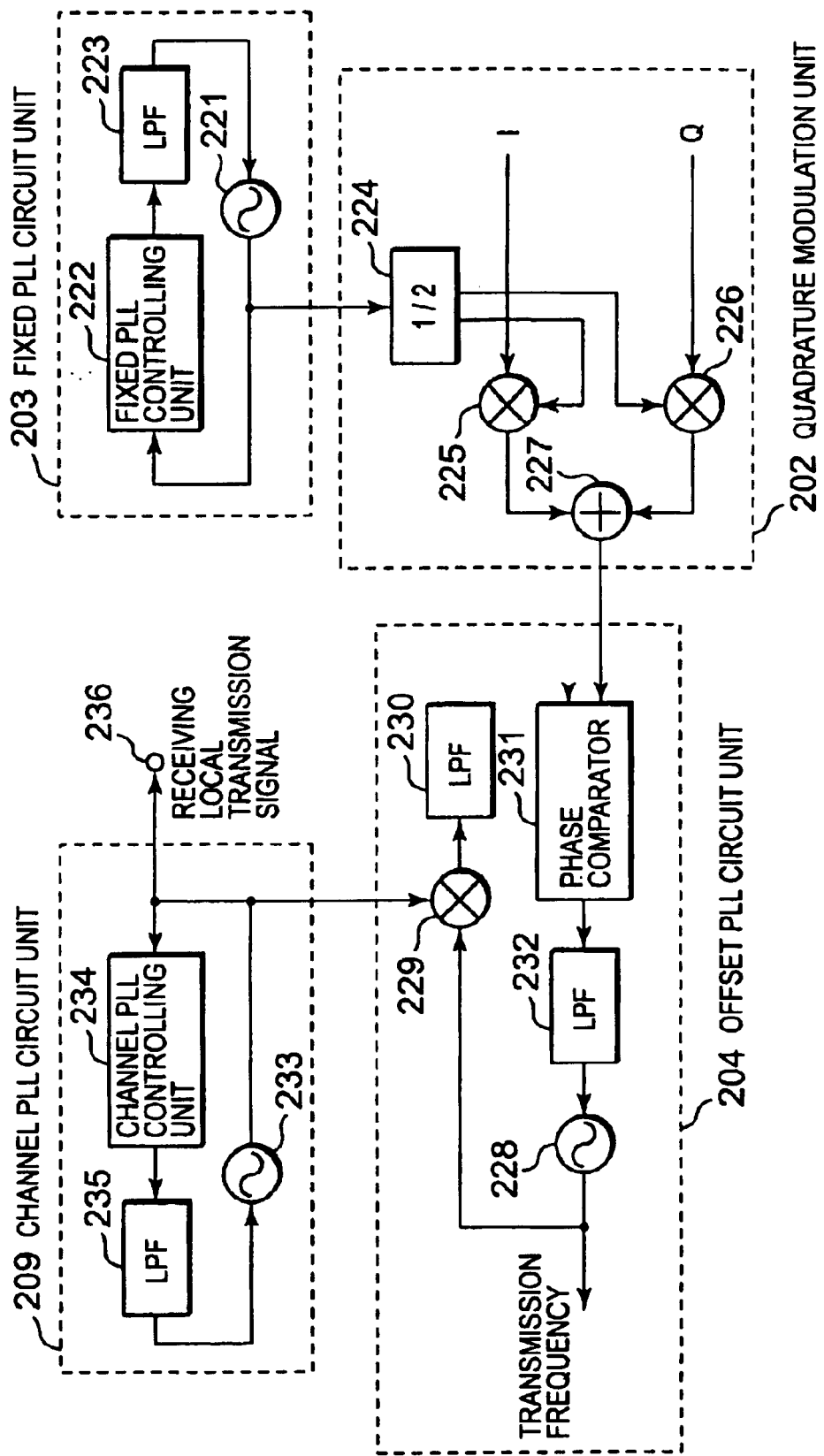
FIG. 2 is a view explaining a PLL circuit system in FIG. 1.
Figure 3:
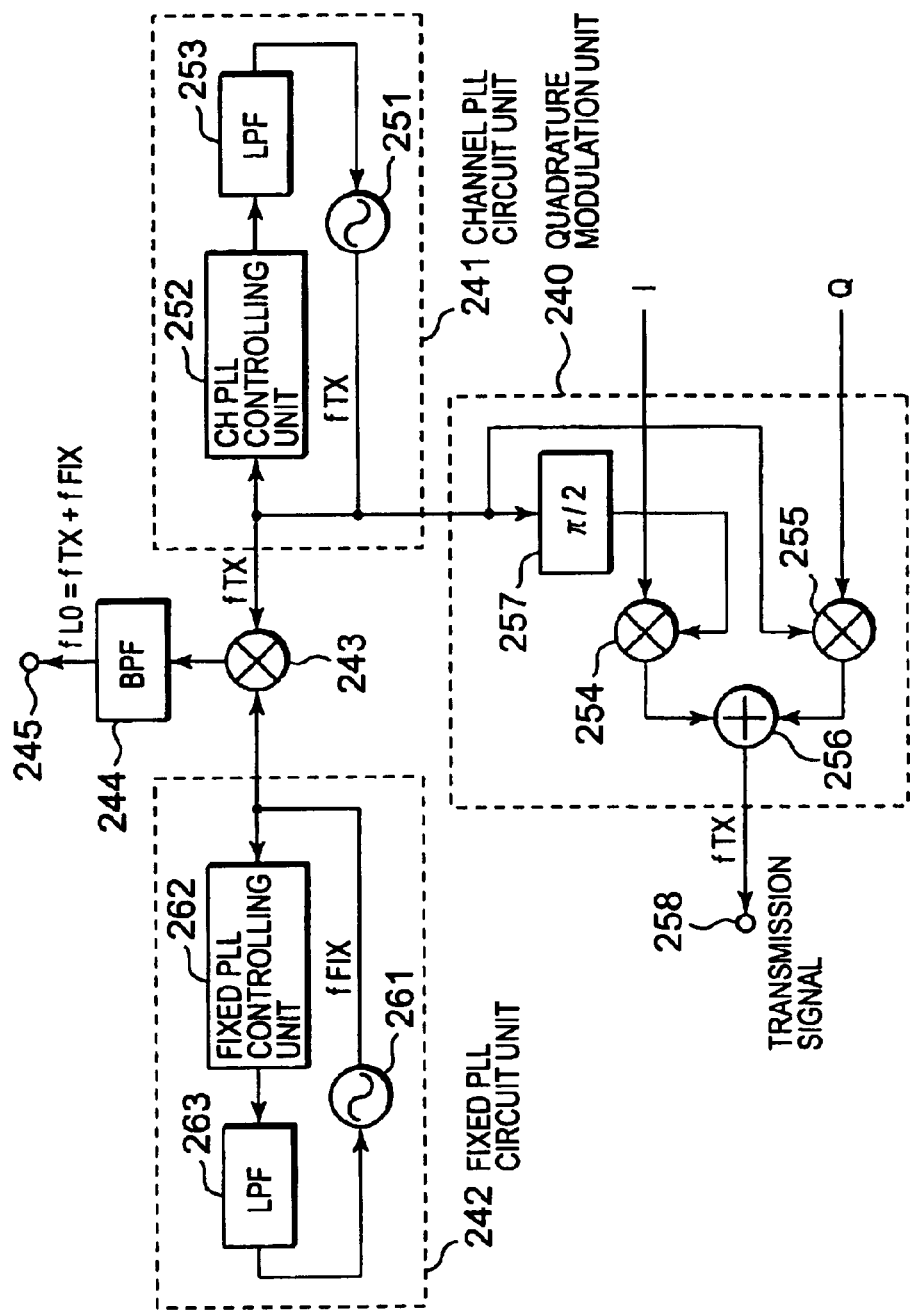
FIG. 3 is a view explaining a PLL circuit system for W-CDMA.
Figure 4:
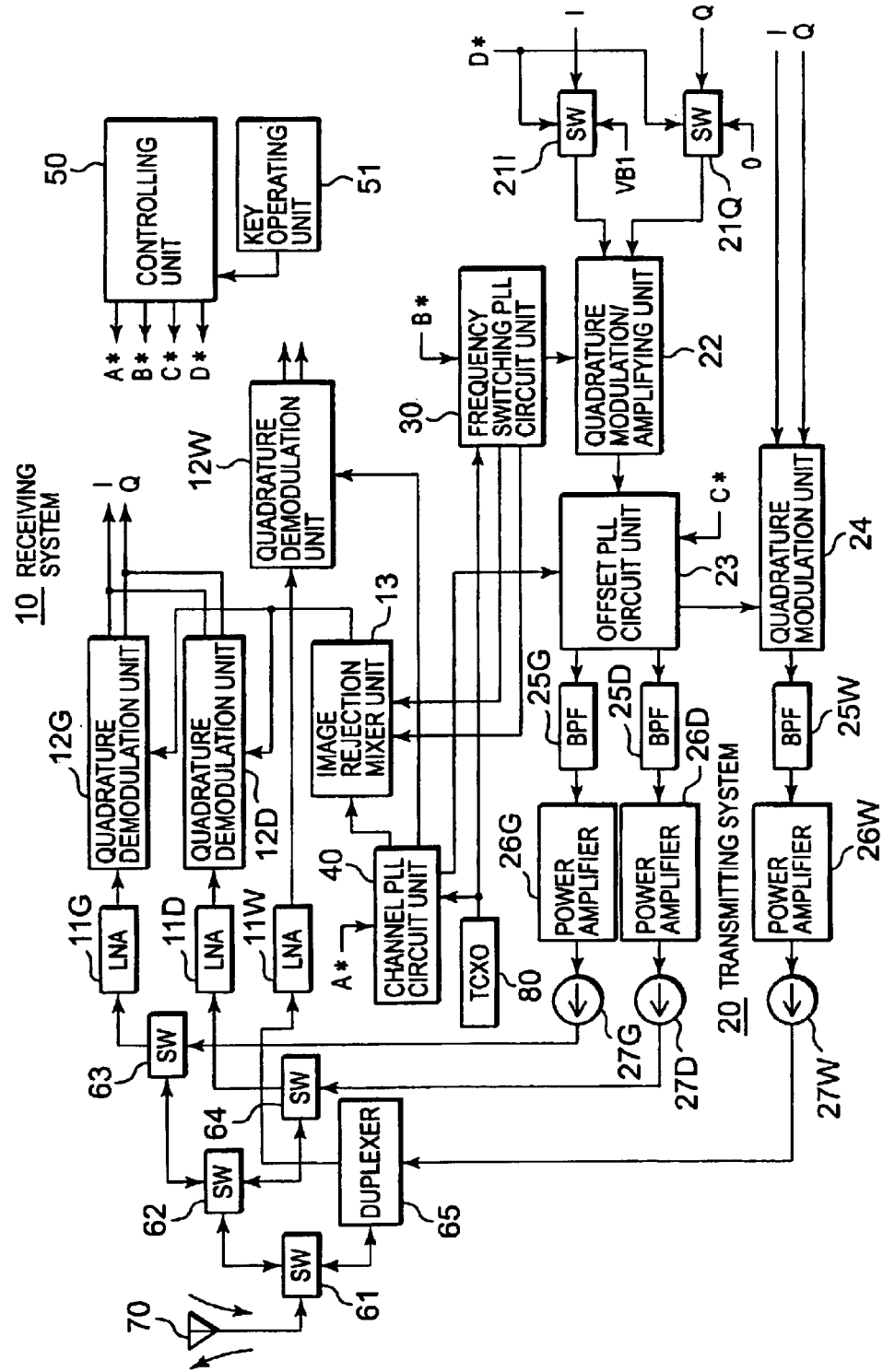
FIG. 4 is a block diagram showing an entire configuration of an embodiment of a multi-band radio signal transmitter/receiver according to the present invention.

FIG. 4 is a block diagram showing the entire configuration example of the multi-band radio signal transmitter/receiver in this first embodiment. The multi-band radio signal transmitter/receiver in this embodiment has a receiving system 10, a transmitting system 20, a frequency switching PLL circuit unit 30, a channel PLL circuit unit 40 and a controlling unit 50, and also has switching circuits 61, 62, 63 and 64, which are switched on the basis of a communication method, a band and a transmission/reception which are to be used, and a duplexer 65.

Here, the frequency switching PLL circuit unit 30 corresponds to first frequency signal generating means in claim 1.

Also, the channel PLL circuit unit 40 corresponds to a second frequency signal generating means in claim 1.

The switching circuit 61 is a high frequency switch (antenna switch), which is switched between a case of GSM/DCS mode and a case of UMTS mode and switches between a transmission signal to an antenna 70 and a reception signal. The switching circuit 62 is a high frequency switch (mode switching switch) switched between a case of GSM mode and a case of DCS mode. The switching circuit 63 is a high frequency switch for switching between the transmission signal and the reception signal in the case of the GSM mode. Also, the switching circuit 64 is a high frequency switch for switching between the transmission signal and the reception signal in the case of the DCS mode.

The receiving system 10 includes: a variable gain low noise amplifier 11G and a quadrature demodulation unit 12G which are turned on by a supply of a power supply in the GSM mode; a variable gain low noise amplifier 11D and a quadrature demodulation unit 12D which are turned on by a supply of a power supply at the DCS mode time; a variable gain low noise amplifier 11W and a quadrature demodulation unit 12W which are turned on by a supply of a power supply at the UMTS (W-CDMA) mode time; and an image rejection mixer unit 13.

The image rejection mixer unit 13 generates a receiving local oscillation frequency signal in the GSM mode or a receiving local oscillation frequency signal in the DCS mode, from a signal from the channel PLL circuit unit 40 and a signal from the frequency switching PLL circuit unit 30, and sends the respective receiving local oscillation frequency signals to the quadrature demodulation unit 12G or the quadrature demodulation unit 12D. In this case, as described later, the image rejection mixer unit 13 generates the receiving local oscillation frequency in the GSM mode and the receiving local oscillation frequency in the DCS mode, which are equal to the reception signal frequency in the GSM mode and the reception signal frequency in the DCS mode, respectively.

The transmitting system 20 includes switching circuits 21I and 21Q, a quadrature modulation/amplifying unit 22, an offset PLL circuit unit 23, a quadrature modulation unit 24 for the UMTS mode, a band pass filter 25G that is turned on by a supply of a power supply in the GSM mode, a power amplifier 26G and an isolator 27G, and a band pass filter 25D that is turned on by a supply of a power supply in the DCS mode, a power amplifier 26D and an isolator 27D, and a band pass filter 25W that is turned on by a supply of a power supply in the UMTS mode, a power amplifier 26W and an isolator 27W.

The switching circuits 21I and 21Q are switched in accordance with a switching control signal from the controlling unit 50 so as to send an I signal a Q signal from a baseband circuit to the quadrature modulation/amplifying unit 22 in the GSM/DCS mode, and send a predetermined direct current voltage VB1 (>0) and 0 volt, instead of the I signal and the Q signal, to the quadrature modulation/amplifying unit 22, in the UMTS mode.

The quadrature modulation/amplifying unit 22 functions as the quadrature modulation unit in the GSM/DCS mode, and functions as the amplifier in the UMTS mode, in accordance with the switching through those switching circuits 21I and 21Q. The configurations of those switching circuits 21I and 21Q and the quadrature modulation/amplifying unit 22 will be described later in detail.

The offset PLL circuit unit 23 corresponds to transmitting signal generating means in claim 1, and generates the signals of transmission signal frequencies in the respective modes, in the GSM/DCS mode, in this embodiment, and generates a modulating reference signal sent to the quadrature modulation unit 24, at the UMTS mode time.

The quadrature modulation unit 24 is turned on when the power supply is turned on in the UMTS mode, and it orthogonally modulates the I signal and the Q signal from a baseband signal generating unit by using the modulating reference signal from the offset PLL circuit unit 23, and generates a signal of a transmission signal frequency.

By the way, although a control line is omitted, in the receiving system 10 and the transmitting system 20, the supply control of the power supply to the respective units based on the times of the respective modes is carried out in accordance with the control signal from the controlling unit 50. Also, the switching control of the switching circuits 21I and 21Q is carried out in accordance with the control signal from the controlling unit 50, based on the times of the respective modes.

The frequency switching PLL circuit unit 30 generates a signal of a fixed frequency by using the PLL, from a frequency signal of a high accuracy from a temperature compensated crystal oscillator 80 (hereafter, referred to as TCXO). However, in this embodiment, the thus-generated fixed frequency is assumed to be the frequency different between the cases of GSM/DCS mode and the UMTS mode. The switching of the frequency is carried out by the control signal from the controlling unit 50.

In this embodiment, the frequency switching PLL circuit unit 30 generates a signal of a frequency of, for example, 380 MHz in the GSM/DCS mode, and generates a signal of a frequency of, for example, 415 MHz in the DCS mode.

The channel PLL circuit unit 40 generates a transmitting/receiving reference signal for a channel to be used, from a reference frequency signal from the TCXO 80, in accordance with the control signal from the controlling unit 50.

The controlling unit 50 generates the control signals based on the mode switching operations of a user through an operation key input unit 51 and other key operations. The control signals are sent to the respective units, as mentioned above.

Figure 5:
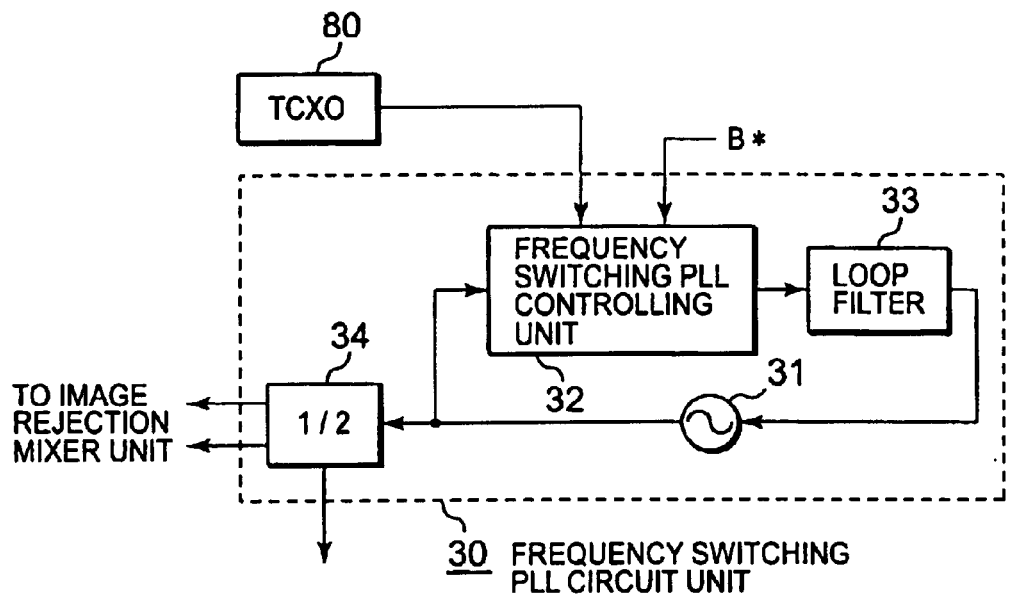
FIG. 5 is a view showing a specific configuration example of a frequency switching PLL circuit unit in FIG. 4.

The further specific configuration example in the respective units in FIG. 4 will be described below. FIG. 5 shows the specific configuration example of the frequency switching PLL circuit unit 30. In this example, the frequency switching PLL circuit unit 30 includes a VCO 31, a frequency switching PLL controlling unit 32, a loop filter 33 and a ½ divider 34.

The frequency switching PLL controlling unit 32 phase-compares an oscillation output signal of the VCO 31 or a signal, in which it is divided, with a signal in which an oscillation output signal of the TCXO 80 is divided, and sends its phase comparison error output through the loop filter 33 to the VCO 31. Due to this loop control, the VCO 31 generates a signal of a fixed frequency that is synchronous in phase with the reference frequency signal from the TCXO 80.

At this time, due to the control signal from the controlling unit 50, a division ratio in the frequency switching PLL controlling circuit 32 is controlled so as to be switched between the GSM/DCS mode and the UMTS mode. Thus, the VCO 31 is controlled so as to output a signal of a frequency of, for example, 760 MHz in the GSM/DCS mode, and output a signal of a frequency of, for example, 830 MHz in the UMTS mode.

Then, frequency signals, in which a frequency signal from the VCO 31 is divided into half frequencies by the ½ divider 34, become outputs of this frequency switching PLL circuit unit 30. In this case, the frequency signals, in which frequencies are equal and phases are different from each other by 90 degrees, from the ½ divider 34, are sent to the image rejection mixer unit 13 from this frequency switching PLL circuit unit 30. Also, the frequency signal of one phase is sent to the quadrature modulation/amplifying unit 22.

Figure 6:
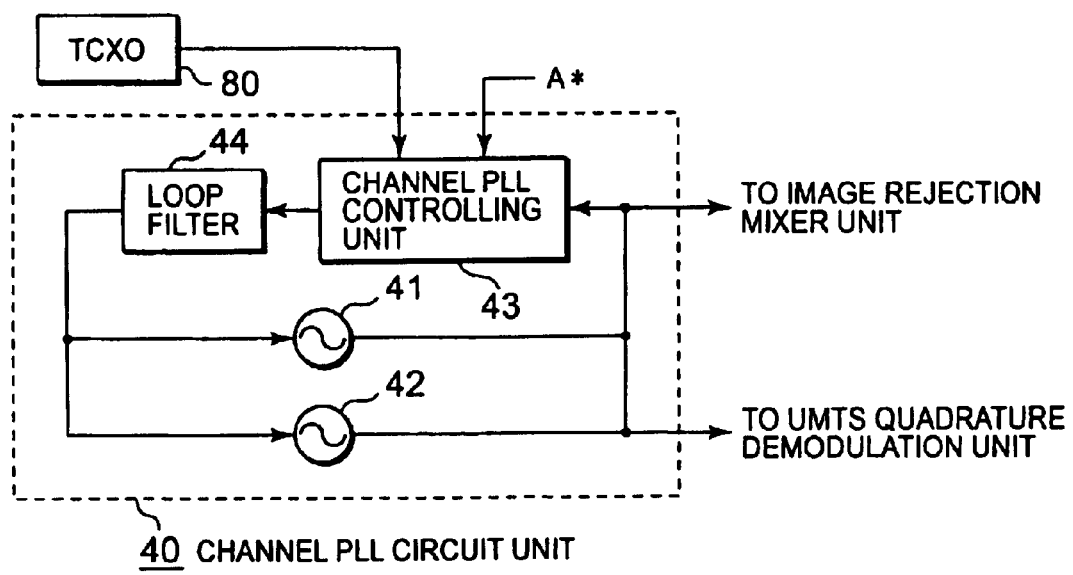
FIG. 6 is a view showing a specific configuration example of a channel PLL circuit unit in FIG. 4.

FIG. 6 shows the specific configuration example of the channel PLL circuit unit 40. In this example, the channel PLL circuit unit 40 includes a VCO 41 for the GSM/DCS mode, a VCO 42 for the UMTS mode time, a channel PLL controlling unit 43 and a loop filter 44.

The VCO 41 for the GSM/DCS mode can be operated only at the GSM/DCS mode, in accordance with the control signal from the controlling unit 50, although the illustration is omitted. Also, the VCO 42 for the UMTS mode can be operated only at the UMTS mode.

Then, the channel PLL controlling unit 43 phase-compares an oscillation output signal of the VCO 41 or the VCO 42 or a signal in which it is divided, with a signal in which the oscillation output signal of the TCXO 80 is divided, and sends its phase comparison error output through the loop filter 44 to the VCO 41 or the VCO 42. Due to this loop control, the VCO 41 or the VCO 42 generates a signal of a frequency for a channel that is synchronous in phase with the reference frequency signal from the TCXO 80 and specified by the control signal from the controlling unit 50. At this time, due to the control signal from the controlling unit 50, a division ratio in the channel PLL controlling circuit 43 is switch-controlled such that the VCO 41 or the VCO 42 outputs the signal of the frequency corresponding to the channel to be used.

In this case, the VCO 41 for the GSM/DCS mode, in accordance with the control signal from the controlling unit 50, generates the frequency signals in the range represented by:
In Transmission Mode of GSM Mode; 1295 MHz to 1330 MHz
In Reception Mode of GSM Mode; 1340 MHz to 1375 MHz
In Transmission Mode of DCS Mode; 1295 MHz to 1370 MHz
In Reception Mode of DCS Mode; 1390 MHz to 1465 MHz
By the way, this embodiment is as follows:
Transmission Signal Frequency of GSM Mode;
   880 MHz to 915 MHz
Reception Signal Frequency of GSM Mode;
   925 MHz to 960 MHz
Transmission Signal Frequency of DCS Mode;
   1710 MHz to 1785 MHz
Reception Signal Frequency of DCS Mode;
   1805 MHz to 1880 MHz
They are designed so as to be different by 45 MHz and 95 MHz from the transmission signal frequency and the reception signal frequency of each channel in the respective modes and designed so as to be different by 415 MHz from the oscillation frequencies for the channels at the respective modes in the VCO 41 for the GSM/DCS mode.

Also, the VCO 42 for the UMTS mode generates the frequency signal in the range between 2110 MHz and 2170 MHz, in accordance with the control signal from the controlling unit 50. In the case of this example, the oscillation frequency of the VCO 42 for the UMTS mode is equal to the reception signal frequency of the UMTS mode.

By the way, the transmission signal frequency of the UMTS mode is designed so as to be between 1920 MHz and 1980 MHz, and it is designed so as to be different by 190 MHz from the oscillation frequency of the VCO 42 for the UMTS mode.

Figure 7:
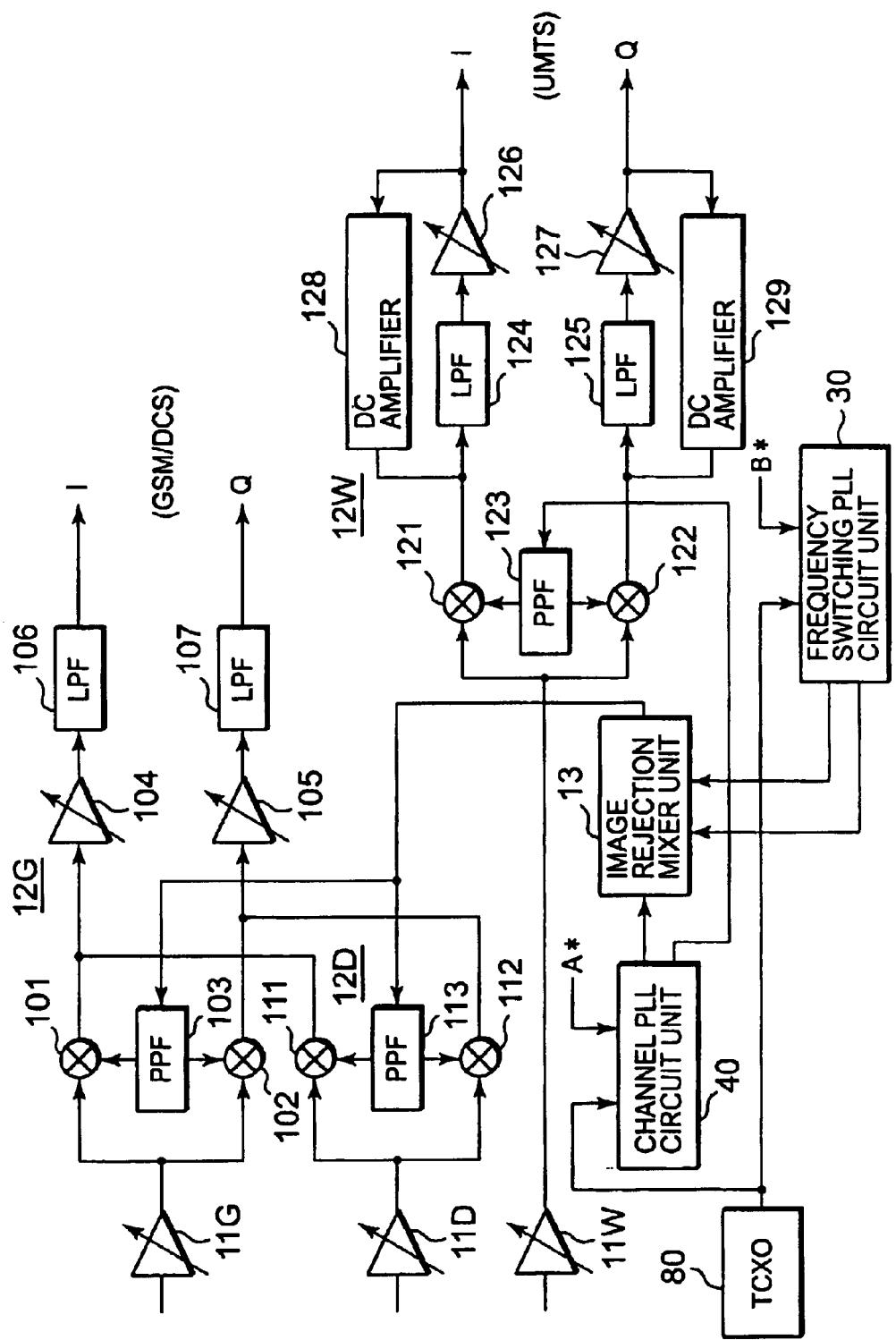
FIG. 7 is a view showing a specific configuration example of a receiving system 10 in FIG. 4.

Next, FIG. 7 shows the specific configuration example of the receiving system 10. That is, in the receiving system 10 of this example, the reception signal in the GSM mode from the variable gain low noise amplifier 11G is sent to frequency mixers 101 and 102, and the reception signal in the DCS mode from the variable gain low noise amplifier 11D is sent to frequency mixers 111 and 112, and the reception signal in the UMTS mode time from the variable gain low noise amplifier 11W is sent to frequency mixers 121 and 122.

Also, in the GSM mode, the receiving local oscillation frequency signal (a frequency equal to a reception signal frequency) for the GSM mode is obtained from the image rejection mixer unit 13. It is sent to the frequency mixers 101 and 102 through a poly-phase filter 103 having a function of generating local oscillation signals of phases orthogonal to each other.

Thus, the I signal and the Q signal in the GSM mode are demodulated and obtained from the frequency mixers 101 and 102. The I signal and the Q signal are sent through variable gain amplifiers 104, 105, respectively, and further through low pass filters 106 and 107, respectively, to a baseband processing unit (not shown).

Also, in the DCS mode, the receiving local oscillation frequency signal (a frequency equal to a reception signal frequency) for the DCS mode is obtained from the image rejection mixer unit 13. It is sent to the frequency mixers 111 and 112 through a poly-phase filter 113 having a function of generating local oscillation signals of phases orthogonal to each other.

Thus, the I signal and the Q signal in the DCS mode are demodulated and obtained from the frequency mixers 111 and 112. The I signal and the Q signal are sent through the variable gain amplifiers 104, 105, respectively, and further through the low pass filters 106 and 107, respectively, to the baseband processing unit (not shown).

On the other hand, the local oscillation frequency signal of the frequency equal to the reception signal frequency is obtained from the channel PLL circuit unit 40, at the time of the UMTS mode, as mentioned above. So, the frequency signal from this channel PLL circuit unit 40 is sent to the frequency mixers 121 and 122 through a poly-phase filter 123 having a function of generating local oscillation signals of phases orthogonal to each other.

Thus, at the time of the UMTS mode, the I signal and the Q signal are demodulated and obtained from the frequency mixers 121 and 122. The I signal and the Q signal are sent through low pass filters 124 and 125, respectively, and further through variable gain amplifiers 126, 127, respectively, to a baseband processing unit (not shown).

Moreover, in this example, output signals of the variable gain amplifiers 126 and 127 are fed back to the output sides of the frequency mixers 121 and 122 through direct current amplifiers (DC amplifiers) 128 and 129 to thereby suppress the direct current offset components generated in the baseband signals of the I signal and the Q signal through direct conversion (DCR).

By the way, in a digital modulating method of a narrow band used in the GSM and the DCS, at the time of the output of the direct current offset components generated through the DCR in the demodulator output, in short, the baseband signal, the circuit for the direct current offset suppression through the direct current feed-back can not be used. This is because when this circuit is used, a low region of the frequency is cut away, which results in the loss of a part of demodulation signal data.

On the other hand, in the W-CDMA signal of the UMTS system, its band is 2 MHz and is sufficiently wide as compared with the GSM/DCS system. Thus, even if the direct current feedback causes the low band frequency to be removed, the information contained in the signal is not severely lost.

Usually, a cutoff frequency of the low band is about 2 kHz. However, if a low band frequency such as 2 kHz is lost in the GSM/DCS, the normal reception becomes impossible. This fact indicates that although in the W-CDMA system, the direct current offset cancel can be attained by using the relatively simple circuit as shown in FIG. 7, it is difficult in the case of the GSM/DCS.

In this way, in the UMTS mode, without any usage of the offset frequency to reduce the direct current offset such as the GSM/DCS mode, the oscillation frequency of the VCO 42 in the channel PLL circuit unit 40 can be oscillated at a frequency (2110 to 2170 MHz) equal to a frequency of a reception RF signal.

Figure 8:
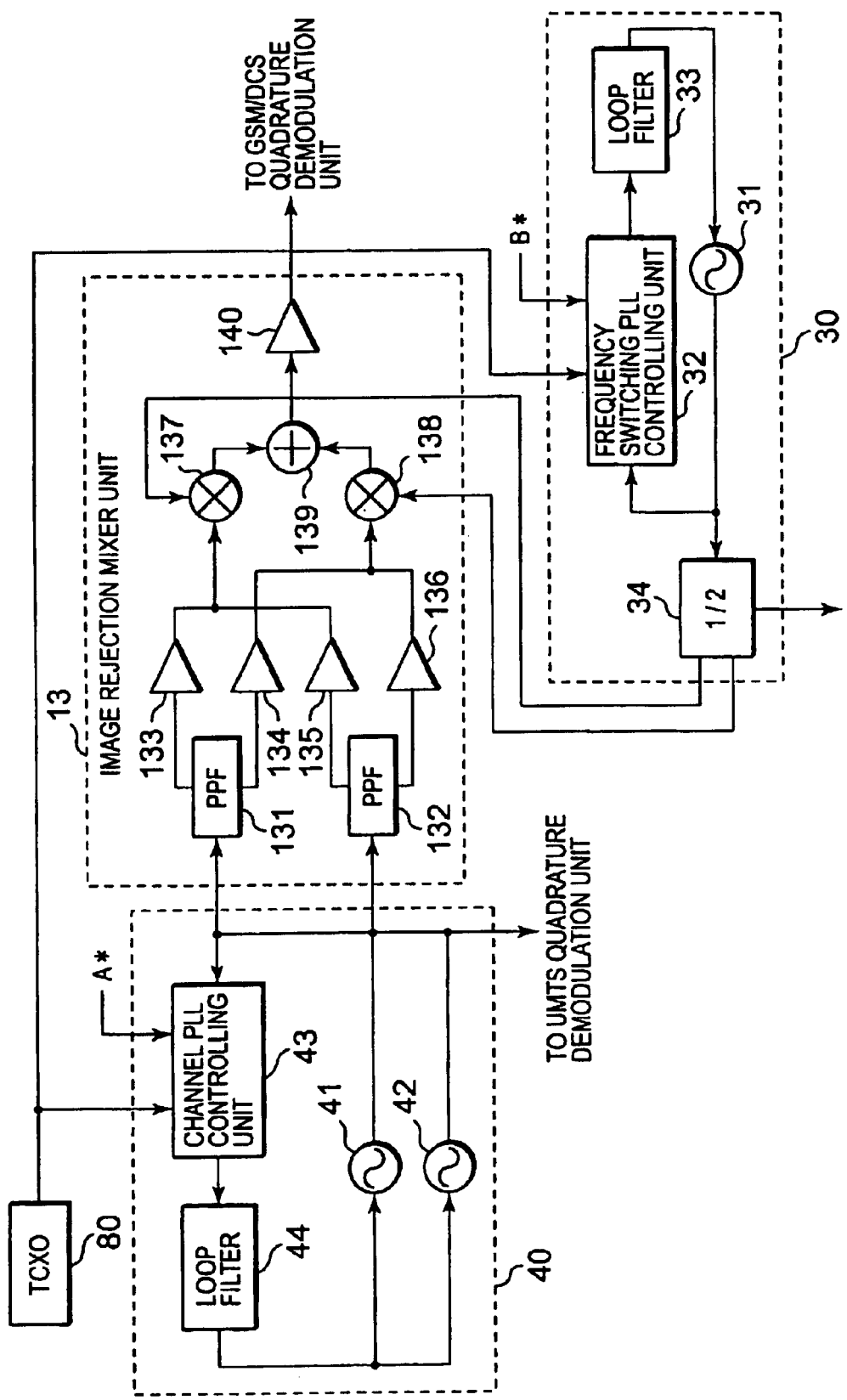
FIG. 8 is a view explaining a specific configuration example of an image removing mixer unit in FIG. 4.

FIG. 8 is a view explaining the configuration example of the image rejection mixer unit 13. As mentioned above, the image rejection mixer unit 13 generates the receiving local oscillation frequency signal equal to the reception signal frequency, from the frequency signal from the channel PLL circuit unit 40 in the GSM/DCS mode and the frequency signal from the frequency switching PLL circuit unit 30.

As shown in FIG. 8, at the time of the GSM/DCS mode, the output signal of the VCO 41 of the channel PLL circuit unit 40 is sent to poly-phase filters 131 and 132 each having a function of generating signals of phases orthogonal to each other. Then, the phase signals (the 0°-phase signals) from the one of the poly-phase filters 131 and 132 are added through buffer amplifiers 133 and 135 and sent to a frequency mixer 137, and the phase signals (the 90°-phase signals) from the other of the poly-phase filters 131 and 132 are added through buffer amplifies 134 and 136 and sent to a frequency mixer 138.

Then, a frequency signal of a 0°-phase from the divider 34 of the frequency switching PLL circuit unit 30 is sent to the frequency mixer 137, and a frequency signal of a 90°-phase from the divider 34 is sent to the frequency mixer 138. Then, the mixed outputs of the frequency mixers 137 and 138 are sent to an adder 139 and added. Its added output is sent through a high frequency amplifier 140 to the quadrature demodulation units 12G and 12D.

Figure 9:
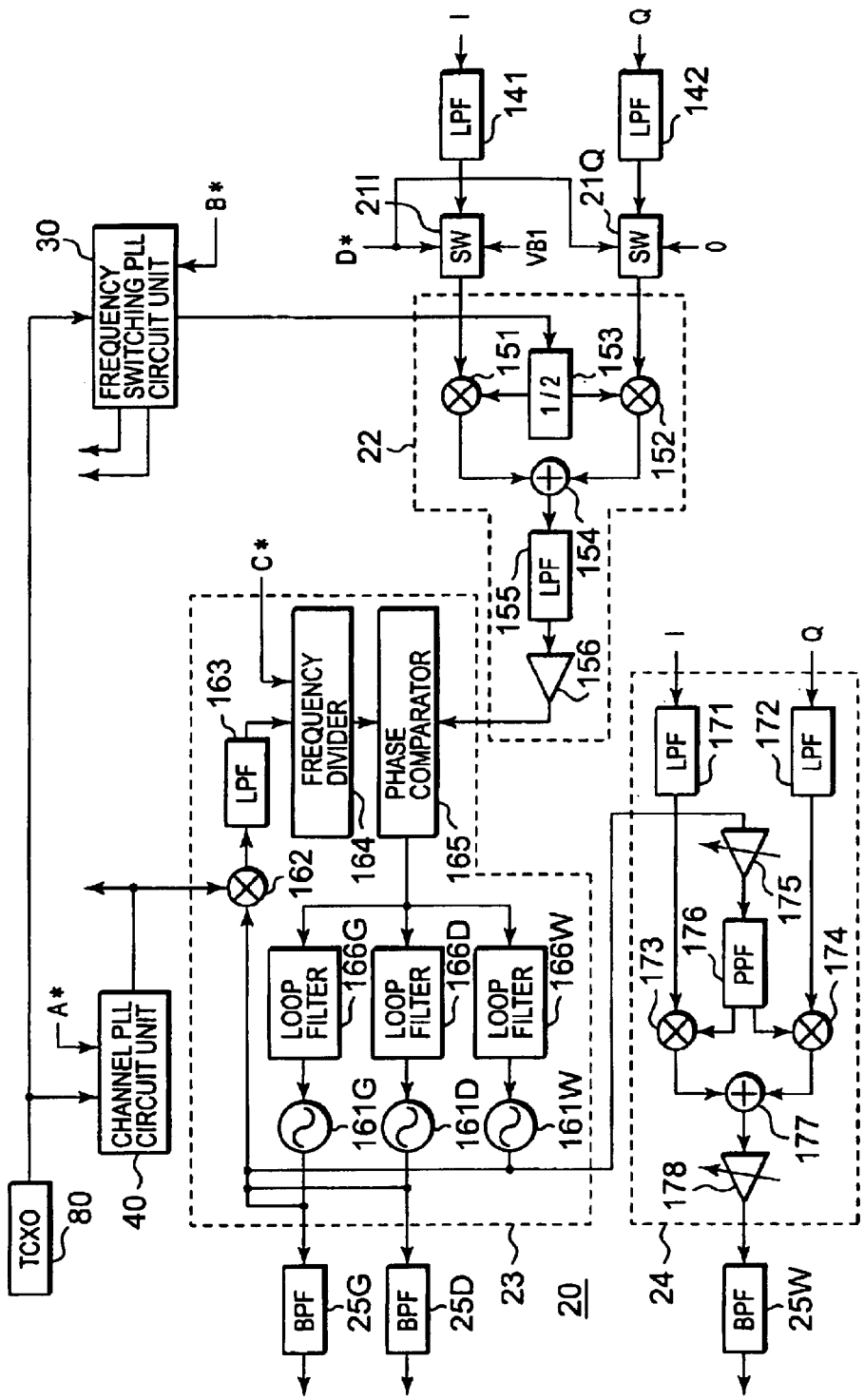
FIG. 9 is a view showing a specific configuration example of a transmitting system 20 in FIG. 4.

The specific configuration example of the transmitting system 20 will be described below. FIG. 9 is a view showing the configuration example of the transmitting system 20 in this example.

The quadrature modulation/amplifying unit 22 includes frequency mixers 151 and 152, a divider 153, an adder 154, a low pass filter 155 and a high frequency amplifier 156. Then, each of the signals from the switching circuits 21I and 21Q serves as one input to each of the frequency mixers 151 and 152. Also, the frequency signal from the frequency switching PLL circuit unit 30 is divided into halves by the divider 153, and separated into signals of two phases orthogonal to each other. Then, a division output signal of a 0°-phase is sent to the frequency mixer 151, and a division output signal of a 90°-phase is sent to the frequency mixer 152.

Then, the output signals of the frequency mixers 151 and 152 are added by the adder 154. Its added output is sent through the low pass filter 155 and the high frequency amplifier 156 to the offset PLL circuit unit 23.

The I signal and the Q signal from the baseband processing circuit (not shown) are sent through low pass filters 141 and 142 to the one input terminals of the switching circuits 21I and 21Q. The predetermined direct current voltage VB1 is applied to the other input terminal of the switching circuit 21I. Also, 0 volt is applied to the other input terminal of the switching circuit 21Q.

Those switching circuits 21I and 21Q are switched by the control signal from the controlling unit 50. At the time of the GSM/DCS mode, they output the I signal and the Q signal sent to the one input terminals to the quadrature modulation/amplifying unit 22, and at the time of the UMTS mode, they output the direct current voltage VB1 and 0 volt sent to the other input terminals to the quadrature modulation/amplifying unit 22. In accordance with the input switching caused by the switching between those switching circuits 21I and 21Q, the quadrature modulation/amplifying unit 22 functions as the quadrature modulation unit at the GSM/DCS mode, and functions as the amplifier of the frequency signal from the frequency switching PLL circuit unit 30, at the UMTS mode.

Figure 10A:
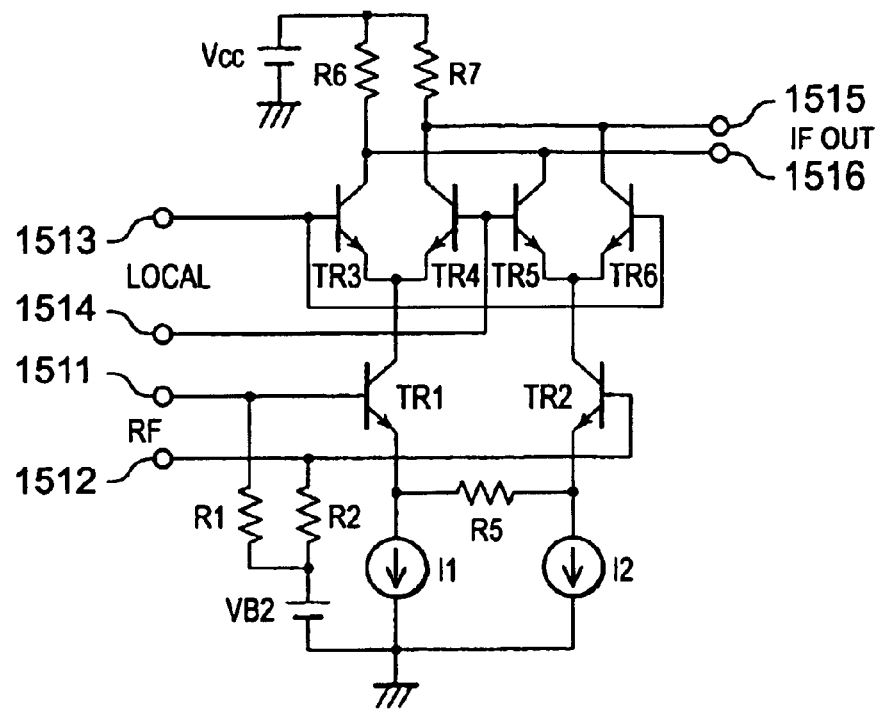
FIG. 10 is a view explaining a specific configuration example of a quadrature modulation/amplifying unit 22 in FIG. 4.

The frequency mixers 151 and 152 in the quadrature modulation/amplifying unit 22 are configured by using a double balanced type mixer referred to as a Gilbert cell mixer. FIG. 10(A) shows a circuit example of the Gilbert cell mixer. In this example, two mixer circuits of FIG. 10(A) are used to configure the frequency mixers 151 and 152.

The Gilbert cell mixer is provided with transistors TR1, TR2, TR3, TR4, TR5 and TR6, resistors R1, R2, R5, R6 and R7, and current sources I1 and I2, as shown in FIG. 10(A).

Then, in the Gilbert cell mixer, usually, a high frequency-signal RF is inputted between input terminals 1511 and 1512, and a local oscillation signal LOCAL is sent between input terminals 1513 and 1514. Then, a signal IFOUT after a frequency conversion is outputted between output terminals 1515 and 1516.

In this embodiment, the frequency signal from the frequency switching PLL circuit unit 30 is sent to each of the input terminals 1511 and 1512 of the two frequency mixers 151, 152. Also, the signals from the switching circuits 21I and 21Q are sent between the input terminals 1513 and 1514 of the two frequency mixers 151, 152.

Thus, in the GSM/DCS mode, the switching circuits 21I and 21Q become at a condition at which they send the I signal and the Q signal from the baseband signal generating circuit to the quadrature modulation/amplifying unit 22. Hence, in each of the two frequency mixers 151, 152, the I signal and the Q signal are frequency-mixed with the frequency signal from the frequency switching PLL circuit unit 30. That is, the quadrature modulation/amplifying unit 22 serves as the quadrature modulation unit.

At this time, as for the signal IFOUT after the frequency conversion obtained between the respective output terminals 1515 and 1516 of the two frequency mixers 151, 152, the signal in which the I signal or the Q signal with a predetermined direct current potential, for example, a direct current potential VB1 as a center is superposed on the signal of 415 MHz from the divider 153 is obtained.

On the other hand, in the UMTS mode, the switching circuits 21I and 21Q become at a condition at which they send the direct current voltage VB1 and 0 volt to the quadrature modulation/amplifying unit 22. The baseband signals of the I signal and the Q signal are not sent to the quadrature modulation/amplifying unit 22.

That is, only the proper direct current voltage is applied between the input terminals 1511 and 1512 of the frequency mixer 151 in FIG. 9. For example, the direct current voltage VB1 is applied to the input terminal 1513 on the side connected to bases of the transistor TR3 and the transistor TR6, and 0 V is applied to the input terminal 1514 on the side connected to bases of the transistor TR4 and the transistor TR5. Then, the base currents of the transistor TR4 and the transistor TR5 do not flow. Thus, those transistors are turned off.

Figure 10B:
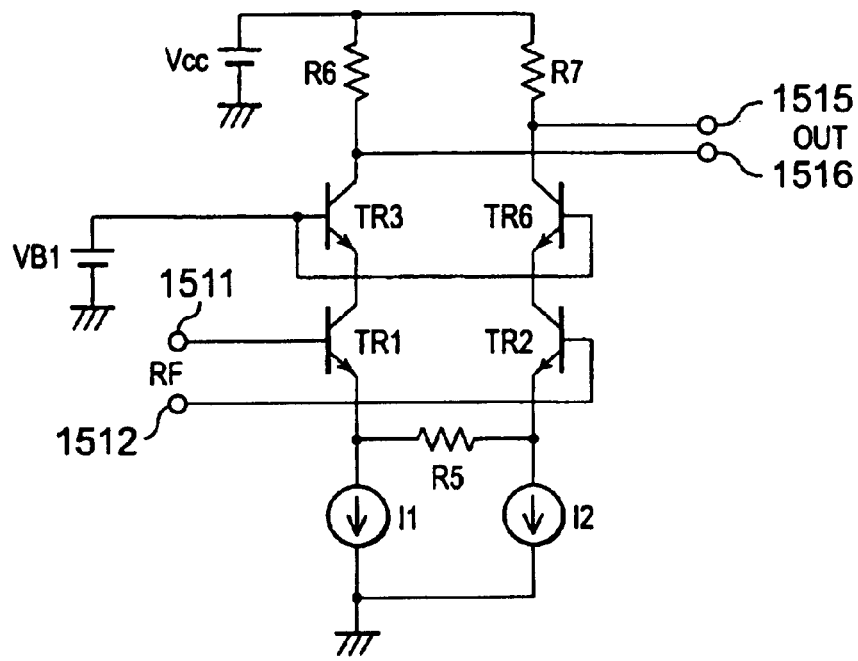

As a result, the circuit of FIG. 10(A) becomes substantially equivalent to a circuit of FIG. 10(B). This becomes a cascode amplifier in which a grounded-base amplifier composed of the transistor TR3 and the transistor TR6 is cascode-connected to a grounded-emitter amplifier of differential inputs composed of the transistor TR1 and the transistor TR2. The operation of the circuit is changed from the mixer to the amplifier.

On the other hand, 0 volt is applied between the input terminals 1511 and 1512 of the frequency mixer 152. Thus, all of the transistors TR3 to TR6 are turned off. Hence, this frequency mixer 152 is not operated.

By the way, in FIG. 4 and FIG. 9, for the sake of the easy understanding of the explanation, the switching circuits 21I and 21Q are installed so as to switch the circuit unit 22 between the quadrature modulation unit and the amplifier. Specifically, the above-mentioned switching can be attained by switching the output of the baseband processing circuit (not shown) to the I signal and the Q signal in the GSM/DCS mode and to the direct current voltage VB1 and 0 volt in the UMTS mode.

Next, the offset PLL circuit unit 23 includes a VCO 161G for the GSM, a VCO 161D for the DCS, a VCO 161W for the UMTS, a frequency mixer 162, a low pass filter 163, a frequency divider 164, a phase comparator 165 and loop filters 166G, 166D and 166W.

In this example, the VCO 161G for the GSM is arranged to oscillate in a frequency range between 880 MHz and 915 MHz.

The VCO 161D for the DCS is arranged to oscillate in a frequency range between 1710 MHz and 1785 MHz.

And, the VCO 161W for the UMTS is arranged to oscillate in a frequency range between 1920 MHz and 1980 MHz.

For this reason, the output signals of the VCOs 161G, 161D and 161W are sent to the frequency mixer 162, and are mixed with the frequency signal from the channel PLL circuit unit 40. Then, its mixed output is sent through the low pass filter 163 to the frequency divider 164.

In this example, this frequency divider 164 serves as the ½ divider in the GSM/DCS mode. In the UMTS mode, this frequency divider is passed through. The switching of this frequency divider 164 is carried out by the control signal from the controlling unit 50.

An output signal of this frequency divider 164 is sent to the phase comparator 165. The signal from the quadrature modulation/amplifying unit 22 is sent to this phase comparator 165, and both of them are phase-compared. Then, its phase comparison output controls the oscillation frequency of the VCO 161G, 161D or 161W through the loop filter 166G, 166D or 166W.

That is, the offset PLL circuit unit 23 generates the signal of the frequency that is the sum or the difference between the frequency signal from the frequency switching PLL circuit unit 30 and the frequency signal from the channel PLL circuit unit 40, in each mode of the GSM/DCS/UMTS.

Then, in the GSM/DCS mode, as mentioned above, the baseband is superposed on the signal from the quadrature modulation/amplifying unit 22. Thus, the output signal of this offset PLL circuit unit 23 is the signal of the transmission frequency in which the baseband signal is superposed on the frequency signal of the difference between the frequency signal from the frequency switching PLL circuit unit 30 and the frequency signal from the channel PLL circuit unit 40. This is outputted as the transmission signal through the band pass filter 25G or 25D and the power amplifier 26G or 26D.

Also, in the UMTS mode, as mentioned above, the signal from the quadrature modulation/amplifying unit 22 is the signal in which the frequency signal from the frequency switching PLL circuit unit 30 is amplified. Thus, the output signal of this offset PLL circuit unit 23 becomes the frequency signal of the sum of the frequency signal from the frequency switching PLL circuit unit 30 and the frequency signal from the channel PLL circuit unit 40. This frequency signal is sent as its modulating reference signal to the quadrature modulation unit 24 for the UMTS.

The quadrature modulation unit 24 includes low pass filters 171 and 172, frequency mixers 173 and 174, a variable gain amplifier 175, a poly-phase filter 176, an adder 177 and a variable gain amplifier 178.

Then, the frequency signal from the offset PLL circuit unit 23 is sent through the variable gain amplifier 175 to the poly-phase filter 176. The signals of phases orthogonal to each other from this poly-phase filter 176 are sent to the frequency mixers 173 and 174, respectively. Also, the I signal and the Q signal from the baseband processing circuit are sent through the low pass filters 171 and 172 to those frequency mixers 173 and 174. Then, output signals of those frequency mixers 173 and 174 are added by the adder 177, and its added output is sent through the variable gain amplifier 178 to the band pass filter 25W. The output of the adder 177 is the transmission frequency signal of the UMTS mode.

The operation of the multi-band radio signal transmitter/receiver having the above-mentioned configuration will be described below.

[Operational Explanation of Receiving System]

The reception high frequency signal is inputted through the antenna 70 to the high frequency switching circuit 61. Here, the switching circuit 61 is switched by the control signal from the controlling unit 50, depending on whether the receiving device is at the GSM/DCS or UMTS (W-CDMA) mode of the system, and switches the path of the signal. When the receiving device is at the GSM or DCS mode, the reception signal is fed to the high frequency switching circuit 62. When it is in the UMTS mode, the reception signal is fed to the duplexer 65.

The reception signal at the time of the GSM/DCS mode is further separated into a GSM path and a DCS path, by the control signal from the controlling unit 50, depending on whether the receiving device is in the GSM mode or in the DCS mode, in the switching circuit 62. In short, the reception high frequency signal is fed from the switching circuit 62 to the high frequency switching circuit 63 at the time of the GSM mode, and fed to the high frequency switching circuit 64 at the time of the DCS mode.

The high frequency switching circuits 63, 64 are designed such that the paths are switched in the transmission and the reception. In a period of a reception slot, the reception high frequency signal is fed from the high frequency switching circuit 63 or 64 to the variable gain low noise amplifier 11G or 11D. Also, in a transmission slot period, the output of the power amplifier 26G or 26D sent through the isolator 27G or 27D is fed from the high frequency switching circuit 63 or 64 to the high frequency switching circuit 62, in the direction opposite to the reception.

Then, in the GSM mode, the reception signal is amplified by the variable gain low noise amplifier 11G, as shown in FIG. 7, and then inputted to the frequency mixers 101 and 102 of the quadrature modulation unit 12G, and multiplied by the local oscillation frequency from the image rejection mixer unit 13 through the poly-phase filter 103. As mentioned above, the local oscillation frequency from the image rejection mixer unit 13 is made equal to the reception signal frequency. Consequently, the direct conversion is attained.

In this way, in the outputs of the frequency mixers 101 and 102, quadrature baseband signals of the I signal and the Q signal are obtained. Those baseband signals are passed through the variable gain amplifiers 104 and 105 and the low pass filters 106 and 107. Thus, after the removal of interference signals in bands except the frequency to be used such as an adjacent channel and the like, they are passed to a digitally processing circuit of a baseband (not shown).

The variable gain low noise amplifier 11G and the variable gain amplifiers 104 and 105 can always keep an input dynamic range of an A/D converter constant by carrying out a control so that an amplitude of an A/D converter input signal is constant, for the sake of the digital process.

In the DCS mode, the paths for the variable gain low noise amplifier 11D and the quadrature demodulation unit 12D are used, and the processes similar to those in the above-mentioned GSM mode are carried out.

On the other hand, in the UMTS mode, the reception high frequency signal is separated from the transmission signal by the duplexer 65, and fed to the variable gain low noise amplifier 11W. At the same time, a continuous transmission signal is fed in the direction of the high frequency switch 61 through the duplexer 65.

Such as the system of the GSM/DCS, the employment of the duplexer 65 without any usage of the high frequency switching circuit is inevitable from a fact that the W-CDMA is a continuous transmitting/receiving system.

The reception high frequency signal is amplified by the variable gain low noise amplifier 11W, as shown in FIG. 7, similarly to the GSM/DCS mode, and fed to the quadrature demodulation unit 12W composed of the frequency mixers 121 and 122 and the poly-phase filter 123. As a result, in the outputs of the frequency mixers 121 and 122, the I signal and the Q signal are respectively obtained.

Those I signal and Q signal are further passed through the low pass filters 124 and 125 and controlled to constant amplitudes by the variable gain amplifiers 126 and 127, and then sent to the baseband processing units at that later stage.

Here, the difference from the receiving system of the GSM/DCS mode is a fact that the direct current feedbacks through the direct current amplifiers 128 and 129 are carried out from the outputs of the circuit composed of the low pass filters 124, 125 and the variable gain amplifiers 126, 127.

As mentioned above, in the W-CDMA signal, its band is 2 MHz and is sufficiently wide as compared with the signal of the GSM/DCS. Thus, even if the direct current feed-back causes the low band frequency to be removed, even the simple circuit shown in FIG. 7 can effectively reduce the direct current offset, without any severe loss of the information contained in the signal.

[Explanation of Operation in Transmitting System]

The operation of the transmitting system 20 will be described below along the flow of the signal. At first, the operation at the time of the GSM mode or the DCS mode is explained.

At the time of the GSM mode or the DCS mode, as mentioned above, the quadrature modulation/amplifying unit 22 is designed so as to be operated as the quadrature modulation unit. Also, the VCO 31 of the channel switching PLL circuit unit 30 is controlled such that the oscillation frequency is 830 MHz.

At this time, as shown in FIG. 9, the I signal and the Q signal are fed from the baseband processing circuit through the low pass filters 141 and 142 to the quadrature modulation/amplifying unit 22 composed of the frequency mixers 151 and 152 and the frequency divider 153.

Here, the signal in which the signal of the frequency of 830 MHz from the VCO 31 of the frequency switching PLL circuit unit 30 is divided by the frequency divider 34 is inputted to the frequency divider 153. Thus, in its outputs, two signals having a frequency of 207.5 MHz orthogonal to each other are obtained. As a result, in the outputs of the quadrature modulation units 151 and 152, the IF signals (intermediate frequency signals) of 207.5 MHz orthogonally modulated by the baseband signals I and Q are obtained. Those IF signals are passed through the low pass filter 155 and the high frequency amplifier 156 to the phase comparator 165 of the offset PLL circuit unit 23.

Then, in the offset PLL circuit unit 23, at the time of the GSM mode, the VCO 161G for the GSM mode is turned on, and the other VCOs 161D, 161W are turned off. Also, at the DCS mode time, the VCO 161D for the DCS mode is turned on, and the other VCOs 161G, 161W are turned off. The output of the VCO 161G or the VCO 161D at the on-state is multiplied by the signal from the VCO 41 for the GSM/DCS (refer to FIG. 6) of the channel PLL circuit unit 40, by the frequency mixer 162.

When the oscillation frequency of the VCO 41 at the time of the GSM mode is assumed to be $f_{CH\_TX\_GSW}$ and that at the time of the DCS mode is assumed to be $f_{CH\_TX\_DCS}$, the oscillation frequency of the VCO 41 is controlled in the channel PLL circuit unit 40 so that as mentioned above, their oscillation are represented as follows.

$$f_{CH\_TX\_GSW}=1295 \text{ to } 1330 \text{ MHz}$$

$$f_{CH\_TX\_DCS}=1295 \text{ to } 1370 \text{ MHz} \qquad (1)$$

Thus, in the output of the frequency mixer 162, the frequencies of the sum and the difference between the oscillation frequency of the VCO 41 and an oscillation frequency $f_{TX\_GSM}$ of the VCO 161G or an oscillation frequency $f_{TX\_DCS}$ of the VCO 161D are obtained. That is, the signals having the following frequencies are fed to the low pass filter 163.

$$f_{CH\_TX\_GSM} \pm f_{TX\_GSM}$$

and $$f_{TX\_DCS} \pm f_{CH\_TX\_DCS} \qquad (2)$$

If the cutoff frequency of the low pass filter 163 is properly selected, the higher frequency of the above-mentioned two frequencies is removed. Then, only the following frequencies (415 MHz) are passed to the frequency divider 164.

$$f_{CH\_TX\_GSM} - f_{TX\_GSM}$$

and $$f_{TX\_DCS} - f_{CH\_TX\_DCS} \qquad (3)$$

In the frequency divider 164, as mentioned above, at the time of the GSM/DCS mode, the signal from the low pass filter 163 is halved to 207.5 MHz and inputted to the phase comparator 165. The signal of the above-mentioned IF frequency 207.5 MHz from the quadrature modulation/demodulating unit 22 is sent to the phase comparator 165. Thus, the phase comparator 165 compares both of the signals. Then, its phase error is outputted to the loop filter 166G or 166D.

The loop filters 166G, 166D integrate the phase error components, convert into a direct current voltage and apply that direct current voltage to control terminals of the VCOs 161G, 161D. The thus-formed loop is converged such that the two input signal frequencies of the phase comparator 165 are equal. After all, they are represented as follows.

$$f_{CH\_TX\_GSM}-f_{TX\_GSM}=415 \text{ MHz}$$

and $$f_{TX\_DCS}-f_{CH\_TX\_DCS}=415 \text{ MHz} \quad (4)$$

When the (1) is substituted in the equation (4), they are represented as follows.

$$f_{TX\_GSM} = f_{CH\_TX\_GSM} - 415 \text{ MHz}$$
$$= 880 \text{ to } 915 \text{ MHz}$$

and $$f_{TX\_DCS} = f_{CH\_TX\_DCS} + 415 \text{ MHz} \quad (5)$$
$$= 1710 \text{ to } 1785 \text{ MHz}$$

Then, the oscillation frequencies of the VCOs 161G, 161D become equal to the transmission frequencies of the GSM mode and the DCS mode.

By the way, the loop filters 166G, 166D are designed so as to have the cutoff frequency sufficiently higher than a modulation rate, so as to enable the GMSK modulation used in the GSM/DCS.

On the other hand, even at the UMTS mode, the operation similar to that in the above-mentioned GSM/DCS mode is carried out. Here, in the channel PLL circuit unit 40, the system is different. Thus, the VCO 42 is turned on and used. The operation in the UMTS mode will be described below.

At the time of the UMTS mode, as mentioned above, the quadrature modulation/amplifying unit 22 is operated as the amplifier. Also, the VCO 31 of the frequency switching PLL circuit unit 30 is controlled such that the oscillation frequency is 760 MHz.

Then, from the frequency switching PLL circuit unit 30, the signal in which the output signal of 760 MHz of the VCO 31 is divided into halves by the frequency divider 34 is sent to the frequency divider 153. It is further divided into halves by this frequency divider 153. Thus, the signal of 190 MHz is fed to the phase comparator 165 through the quadrature modulation/amplifying unit 22 as the amplifier.

Differently from the GSM/DCS mode, the signal of 190 MHz at this UMTS mode is a non-modulation signal. In the offset PLL circuit unit 23, at the UMTS mode time, the VCO 161W for the UMTS is on, and the other VCOs 161G, 161D are off. Then, the output of this VCO 161W, which is at the on-state, is multiplied by the signal from the VCO 41 for the GSM/DCS in the channel PLL circuit unit 40 (refer to FIG. 6) by the frequency mixer 162.

When the oscillation frequency of the VCO 42 at the time of the UMTS mode is assumed to be $f_{CH\_TX\_UMTS}$, the oscillation frequency of the VCO 42 is controlled in the channel PLL circuit unit 40 so that as mentioned above, it is represented as follows.

$$f_{CH\_TX\_UMTS}=2110 \text{ to } 2170 \text{ MHz} \quad (6)$$

Thus, in the output of the frequency mixer 162, the frequencies of the sum and the difference between the oscillation frequency of the VCO 42 and an oscillation frequency $f_{TX\_UMTS}$ of the VCO 161W are obtained. That is, the signals having the following frequencies are fed to the low pass filter 163.

$$f_{CH\_TX\_UMTS} \pm f_{TX\_UMTS} \quad (7)$$

If the cutoff frequency of the low pass filter 163 is properly selected, the higher frequency of the above-mentioned two frequencies is removed. Then, only the following frequency (190 MHz) is obtained.

$$f_{CH\_TX\_UMTS}-f_{TX\_UMTS} \quad (8)$$

This signal is fed to the frequency divider 164. However, at the UMTS mode time, it is inputted through this divider 164 to the phase comparator 165. Thus, the phase comparator 165 is compared with 190 MHz of the IF frequency from the above-mentioned quadrature modulation/amplifying unit 22, and its phase error is outputted to the loop filter 166W.

The loop filter 166W integrates the phase error components, converts into a direct current voltage and applies that direct current voltage to a control terminal of the VCO 161W. The thus-formed loop is converged such that the two input signal frequencies of the phase comparator 165 are equal. After all, it is represented as follows.

$$f_{CH\_TX\_GSM}-f_{TX\_GSM}=190 \text{ MHz} \quad (9)$$

When the equation (6) is substituted in the equation (9), it is represented as follows.

$$f_{TX\_UMTS} = f_{CH\_TX\_UMTS} - 190 \text{ MHz} \quad (10)$$
$$= 1920 \text{ to } 1980 \text{ MHz}$$

Then, the oscillation frequency of the VCO 161W becomes equal to the transmission frequency at the time of the UMTS mode.

Then, the oscillation frequency signal of this VCO 161W is sent to the quadrature modulation unit 24, and frequency-mixed with the I signal and the Q signal from the baseband processing unit (not shown), and a modulation transmission signal is generated. Then, that modulation transmission signal is fed through the band pass filter 25W and the power amplifier 26W to the antenna 70.

[Generation of Receiving Local Oscillation Frequency Signal]

The generation of the receiving local oscillation frequency signal will be described below.

At first, as mentioned above, in the UMTS mode, namely, in the W-CDMA, the direct current offset compensating circuit can be attained by an analog circuit. Thus, even if the local oscillation frequency is leaked to the input side of the variable gain low noise amplifier 11W, for example, to the transmission line connected from the duplexer 65, the direct current offset can be removed by the compensating circuit composed of the direct current amplifiers 128, 129. Hence, the oscillation frequency of the VCO 42 in the channel PLL circuit unit 40 need not be set to a frequency different from the reception high frequency signal. So, as represented by the above-mentioned (6) equation, the oscillation frequency of the VCO 42 can be made equal to the reception frequency in the UMTS band.

On the other hand, at the time of the GSM/DCS mode, it is necessary to reduce as much as possible the direct current offset. Thus, the oscillation frequency of the VCO 41 in the channel PLL circuit unit 40 must be oscillated at a frequency different from the reception frequency.

Now, the oscillation frequencies of the VCO 41 in the reception slot are assumed to be as follows.

$$f_{CH\_RX\_GSM}=1340 \text{ to } 1375 \text{ MHz}$$

$$f_{CH\_RX\_DCS} = 1390 \text{ to } 1465 \text{ MHz} \tag{11}$$

This signal is decomposed into two signals orthogonal to each other by the poly-phase filters 131, 132 in the image rejection mixer unit 13, and inputted through the buffer amplifiers 133 to 136 to the frequency mixers 137 and 138, respectively.

On the other hand, the signal of 830 MHz from the VCO 31 in the frequency switching PLL circuit unit 30 is halved by the frequency divider 34, which results in the signals whose frequencies are 415 MHz and whose phases are orthogonal to each other. Then, the frequency signals of 415 MHz whose phases are orthogonal to each other are fed to the other inputs of the frequency mixers 137 and 138.

At this time, if the four signals inputted to the frequency mixers 137 and 138 have the above-mentioned phase relation, the following signals appear in the outputs of the frequency mixers 137 and 138, respectively.

That is, the following equations are obtained.

$$2 \cdot \sin\omega_{CH\_RF\_GSM} \cdot \sin\omega_{IF} = -\cos(\omega_{CH\_RF\_GSM} + \omega_{IF}) + \cos(\omega_{CH\_RF\_GSM} - \omega_{IF}) \tag{12}$$

$$-2 \cdot \sin\omega_{CH\_RF\_DCS} \cdot \sin\omega_{IF} = -\cos(\omega_{CH\_RF\_DCS} + \omega_{IF}) - \cos(\omega_{CH\_RF\_DCS} - \omega_{IF})$$

$$2 \cdot \cos\omega_{CH\_RF\_GSM} \cdot \cos\omega_{IF} = -\cos(\omega_{CH\_RF\_GSM} + \omega_{IF}) + \cos(\omega_{CH\_RF\_GSM} - \omega_{IF}) \tag{13}$$

$$2 \cdot \cos\omega_{CH\_RF\_DCS} \cdot \cos\omega_{IF} = -\cos(\omega_{CH\_RF\_DCS} + \omega_{IF}) + \cos(\omega_{CH\_RF\_DCS} - \omega_{IF})$$

As can be understood from those equations, when the outputs from the two frequency mixers 137 and 138 are added, only the following signal is extracted.

$$\cos(\omega_{CH\_RF\_GSM} - \omega_{IF})$$

Or $$\cos(\omega_{CH\_RF\_DCS} - \omega_{IF}) \tag{14}$$

In short, the following frequency is obtained.

$$f_{CH\_RF\_GSM} - f_{IF}$$

Or $$f_{CH\_RF\_DCS} + f_{IF} \tag{15}$$

Here, $f_{IF}$ is the output of the frequency divider 34, and the frequency is 415 MHz.

The circuit composed of those poly-phase filters 131, 132 and the frequency mixers 137, 138 can extract only one frequency of the two frequencies generated when the frequencies are mixed. Thus, this is referred to as an image rejection mixer.

When the equation (11) is substituted in the equation (15), the following equations are obtained.

$$f_{CH\_RF\_GSM} - f_{IF} = (1340 - 415) \sim (1375 - 415) \text{ MHz}$$
$$= 925 \sim 960 \text{ MHz}$$

$$f_{CH\_RF\_DCS} + f_{IF} = (1390 + 415) \sim (1465 + 415) \text{ MHz} \tag{16}$$
$$= 1805 \sim 1880 \text{ MHz}$$

Thus, the frequency equal to the reception frequency of the GSM/DCS can be obtained.

The signal of this image rejection mixer is fed through the high frequency amplifier 140 to the poly-phase filters 103, 113 in the quadrature demodulation units 12G and 12D. The direct quadrature demodulation is carried out by the quadrature demodulation units 12G, 12D composed of the frequency mixers 101, 102 and the frequency mixers 111, 112 and the poly-phase filters 103 and 113.

Consequently, the frequency variable range of the VCO 41 is between 1295 and 1465 MHz, and the frequency variable range of the VCO 42 is between 2110 and 2170 MHz. Thus, they become a practical frequency variable range as the VCO.

Figure 11:
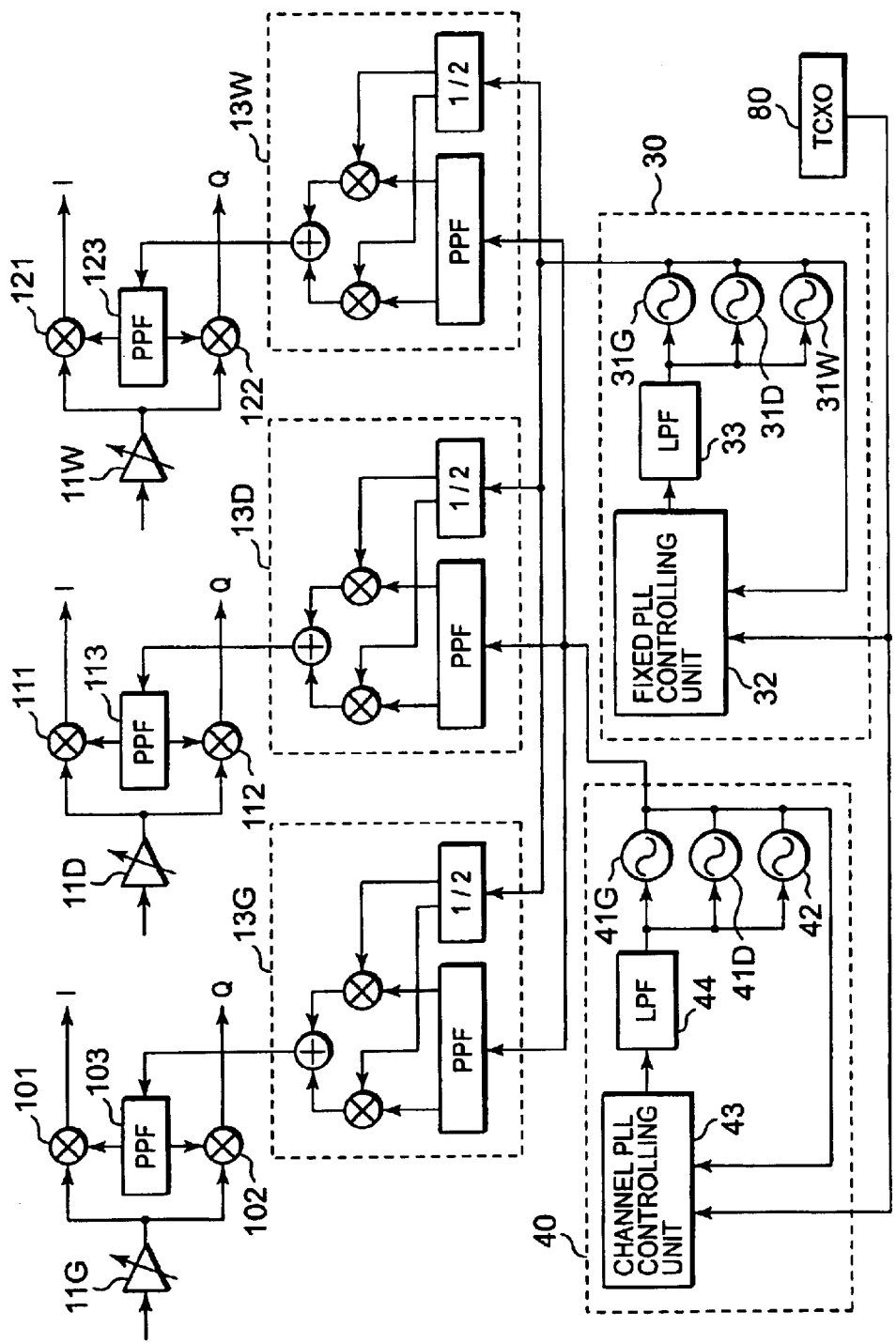
FIG. 11 is a view explaining a conventional configuration example in comparison with an embodiment in the present invention.

FIG. 11 shows the configuration example of the circuit, in which in the multi-band radio signal transmitter/receiver mentioned in the conventional technique, the circuit for converting a signal of a frequency different from a reception high frequency signal into a desirable local oscillation signal immediately before the quadrature modulation unit is used for a local oscillation signal for a dual system of GSM/DCS/UMTS, a triple band terminal.

Figure 12:
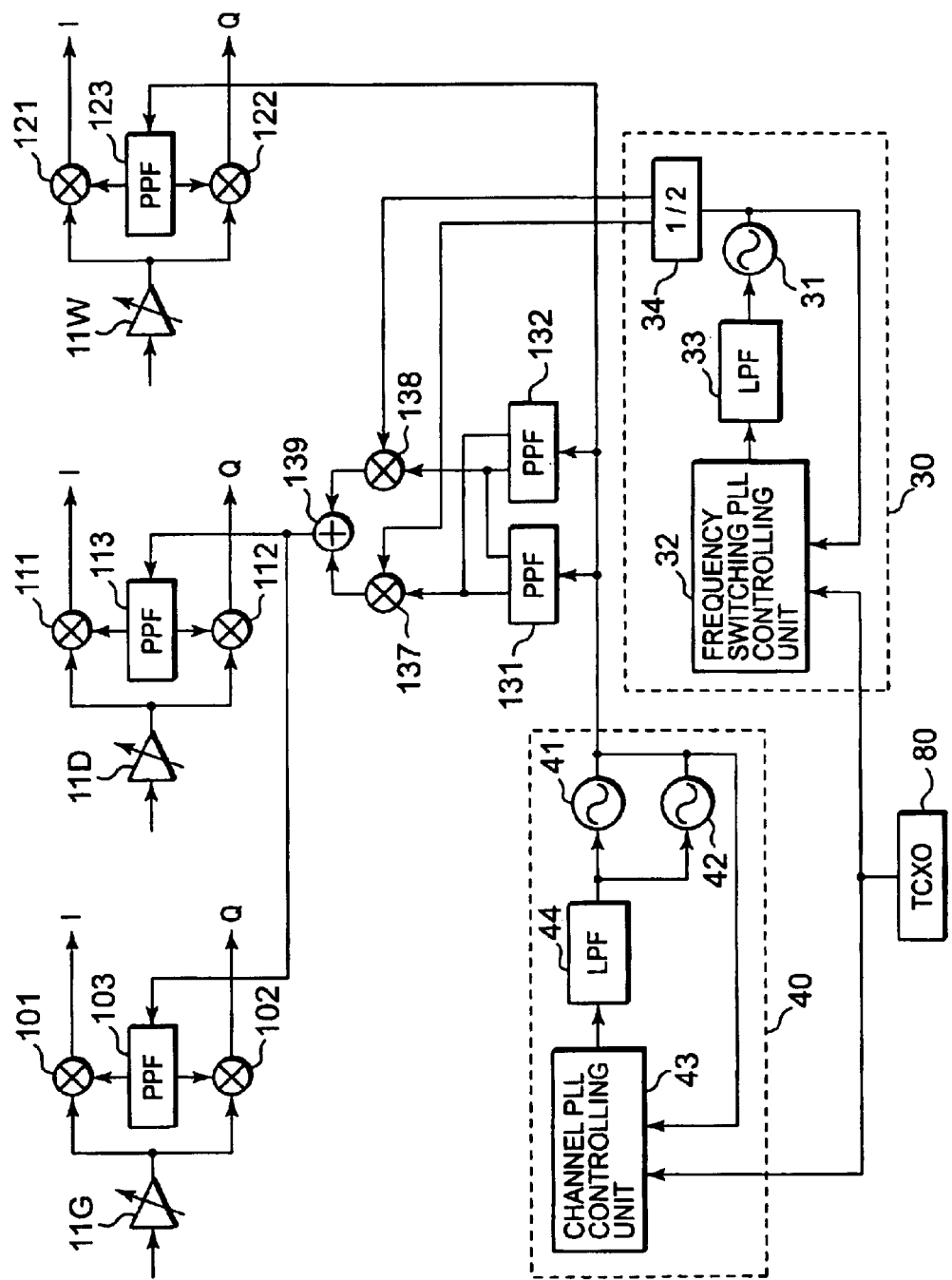
FIG. 12 is a view explaining a configuration of a main portion of an embodiment in the present invention.

Also, FIG. 12 shows the portion in which the circuit configuration of the section corresponding to FIG. 11 is extracted, in the above-mentioned embodiment. In FIG. 11, the same symbols are assigned to the corresponding sections, in order to easily understand the corresponding relation to FIG. 12.

A frequency mixer unit used in FIG. 11 is configured so as to enable the removal of an image frequency so that only a desirable frequency can be generated. In the channel PLL circuit unit 40 and the frequency switching PLL circuit unit 30, the VCO circuits are necessary for the GSM, the DCS and the UMTS, respectively. Also, the image rejection mixer units are necessary for the GSM, the DCS and the UMTS, respectively. Thus, it is understood that the circuit scale is expanded.

On the other hand, in the embodiment of the present invention, as shown in FIG. 12, the image rejection mixer unit 13 is jointly used in the GSM/DCS, and the frequency to be used in the offset PLL is changed between the time of the GSM/DCS and the time of the UMTS. Consequently, the VCO of the channel PLL circuit unit 40 can be divided to the two VCOs such as the VCO 41 for the GSM/DCS and the VCO 42 for the UMTS. The VCO properties required in the GSM/DCS and in the UMTS are different depending on the systems, and the frequency range to carry out the voltage control of the VCO becomes narrow. Thus, the property becomes easy. Also, the number of the VCOs themselves can be reduced. Hence, it can be understood that the large reduction in the circuit scale.

By the way, in FIG. 4, the portion except the loop filter 44 of the channel PLL circuit unit 40, the image rejection mixer unit 13, the quadrature demodulation units 12G, 12D and 12W and the variable gain low noise amplifiers 11G, 11D and 11W can be made into an IC as one IC circuit.

Also, similarly, the portion of the frequency switching PLL circuit unit 30 other than the loop filter 33, the quadrature modulation/amplifying unit 22, the quadrature modulation unit 24, and the portion of the offset PLL circuit unit 23 other than the VCOs 161G, 161D and 161W, the loop filters 166G, 166D and 166W can be made into an IC as one IC circuit.

[Second Embodiment]

Figure 13:
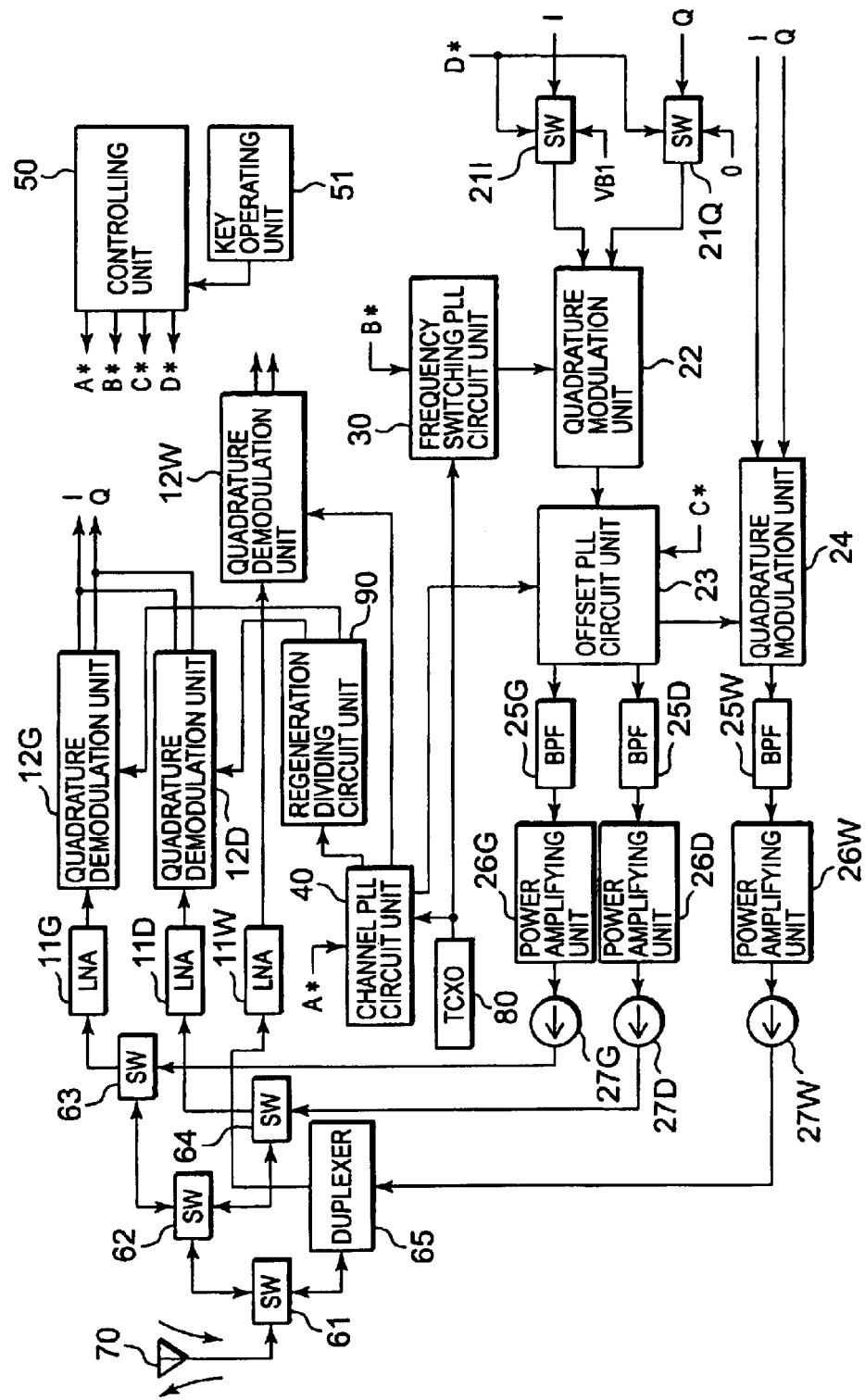
FIG. 13 is a block diagram showing an entire configuration of another embodiment in the present invention.

FIG. 13 shows an embodiment of a multi-band radio signal transmitter/receiver that uses a regeneration dividing circuit unit 90, instead of the image rejection mixer unit 13 in FIG. 4.

In the case of the embodiment in FIG. 13, differently from the case of the embodiment in FIG. 4, the oscillation frequencies $f_{CH\_RX\_GSM}$ and $f_{CH\_RX\_DCS}$ at the reception time of the DCS/GSM mode of the VCO 41 in the channel PLL circuit unit 40 are represented as follows.

$f_{CH\_RF\_GSM}$=1387.5 to 1440 MHz $f_{CH\_RF\_DCS}$=1353.5 to 1410 MHz

However, the frequency during the transmission is equal to the case of the embodiment in FIG. 4, and it is not changed.

Also, at the time of the UMTS, the oscillation frequency of the VCO 42 is equal to the case of the embodiment in FIG. 4, and it is 2110 to 2170 MHz. Consequently, the frequency variable range of the VCO 41 is between 1295 and 1440 MHz, and the frequency variable range of the VCO 42 is between 2110 and 2170 MHz. Thus, they become the attainable frequency range as the VCO, respectively.

Figure 14:
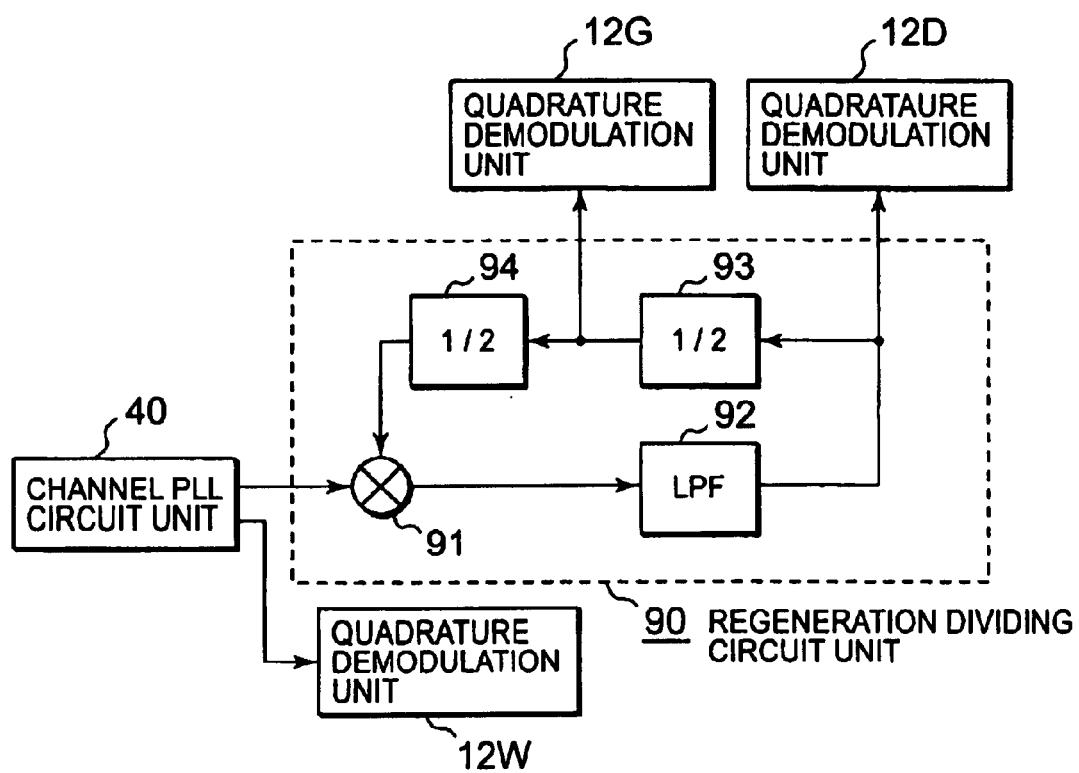
FIG. 14 is a view showing a specific configuration example of a reproduction dividing circuit unit in FIG. 13.

FIG. 14 shows the specific configuration example of the reproduction division circuit unit 90. That is, in this example, the reproduction division circuit unit 90 includes a frequency mixer 91, a low pass filter 92 and ½ dividers 93 and 94.

According to the multi-band radio signal transmitter/receiver having the configuration of the embodiment as mentioned above, the following effects can be obtained.

1. It is possible to attain the direct conversion transmitter/receiver that does not involve the extreme increase in the circuit scale when the RF block for the transmission/reception is made into an IC.

2. The switching of the frequency of the offset PLL allows the number of the voltage control oscillators used at the transmission/reception time to be 2 (two).

3. Due to the reason of the item 1, the extreme increase in the chip area is not involved.

4. Due to the reason of the item 3, the extreme increase in the chip cost is not involved.

5. Due to the reason of the item 1, the extreme deterioration in the chip yield is not involved.

6. Due to the reason of the item 1, the extreme increase in the power consumption of the circuit is not involved.

7. Due to the reason of the item 2, the oscillation frequency range of the voltage control oscillator can be made narrower.

8. Due to the reason of the second item, the voltage control oscillator can be used for each system.

The above-mentioned embodiments are designed such that by switching the input of the Gilbert cell mixer, the combined use is carried out such as the quadrature modulation unit at the GSM/DCS mode and the amplifier at the UMTS mode. However, it is naturally allowable to respectively install the quadrature modulation unit and the amplifier to thereby switch between the GSM/DCS and UMTS modes.

As mentioned above, according to the present invention, it is possible to provide the multi-band radio signal transmitter/receiver that can achieve the miniaturization and the power saving of the hardware circuit.

What is claimed is:

1. A multi-band radio signal transmitter/receiver capable of carrying out a communication through a signal of a first communication method of transmitting/receiving a signal modulated by using information with regard only to a phase and through a signal of a second communication method of transmitting/receiving a signal modulated by using information with regard to a phase and an amplitude and can also carry out a communication in a plurality of different frequency bands, characterized by including:

first frequency signal generating means for generating a signal of a fixed frequency that is different between a time of said first communication method and a time of said second communication method;

second frequency signal generating means for generating a signal of a frequency corresponding to a communication channel to be used, with regard to a communication method and a frequency band that are selected from said first communication method, said second communication method and said plurality of frequency bands, wherein said signal is a transmitting/receiving reference oscillation signal that is used to generate a local oscillation signal for demodulating a reception signal based on said first communication method or a reception signal based on said second communication method for each communication method and is also used to generate a transmission signal based on said first communication method or a transmission signal based on said second communication method;

first communication method modulating means for generating a modulation signal in which a transmitting baseband signal is modulated by using a signal of a fixed frequency for said first communication method from said first frequency signal generating means, as a modulating reference signal, when the transmission signal of said first communication method is generated;

amplifying means for amplifying a signal of a fixed frequency for said second communication method from said first frequency signal generating means, when the transmission signal of said second communication method is generated; and transmitting signal generating means for generating a modulating reference signal, which when generating the transmission signal of said first communication method, phase-compares said modulation signal from said first communication method modulating means with said transmitting/receiving reference oscillation signal from said second frequency signal generating means, controls a variable frequency oscillator based on its phase comparison output and thereby generates a modulation transmission signal, and when generating the transmission signal of said second communication method, phase-compares said amplified signal of the fixed frequency for said second communication method from said amplifying means with said transmitting/receiving reference oscillation signal from said second frequency signal generating means, and based on its phase comparison output, generates a modulation signal of said second communication method.

2. The multi-band radio signal transmitter/receiver according to claim 1, characterized in that said first communication method modulating unit is quadrature modulation means using a balanced modulator, and when the transmission signal of said second communication method is generated, since said balanced modulator is used as an amplifier, said first communication method modulating unit is also used for said amplifying unit.

3. The multi-band radio signal transmitter/receiver according to claim 1, characterized in that transmission/reception signals of two kinds of a GSM mode and a DCS mode are treated as said first communication method, and a transmission/reception signal of a UMTS mode is treated as said second communication method, and said second frequency signal generating means has two variable frequency oscillators of a first variable frequency oscillator used both in said GSM mode and said DCS mode, and a second variable frequency oscillator for said UMTS mode.

4. The multi-band radio signal transmitter/receiver according to claim 1, characterized by including:
   first demodulating means of the reception signal of said first communication method; and
   regeneration dividing means for generating said receiving local oscillation signal for said first communication method sent to said first demodulating means, from said transmitting/receiving reference oscillation signal from said second frequency signal generating means.

5. The multi-band radio signal transmitter/receiver according to claim 1, characterized by including:
   first demodulating means of the reception signal of said first communication method; and
   means for generating the receiving local oscillation signal for said first communication method sent to said first demodulating means, from said transmitting/receiving reference oscillation signal from said second frequency signal generating means and the signal of the fixed frequency for said first communication method from said first frequency signal generating means.

6. The multi-band radio signal transmitter/receiver according to claim 1, characterized in that said transmitting/receiving reference oscillation signal from said second frequency signal generating means is sent as said receiving local oscillation signal for said second communication method, to a second demodulating means of the reception signal of said second communication method.

7. The multi-band radio signal transmitter/receiver according to claim 6, characterized in that said second demodulating means includes a circuit for removing a low band frequency through direct current feedback.

8. The multi-band radio signal transmitter/receiver according to claim 1, characterized by including a second communication method modulating means, which generates the modulation transmission signal of said second communication method, by modulating a transmitting baseband signal based on a modulating reference signal to generate the modulation transmission signal of said second communication method from said transmitting signal generating means.

9. The multi-band radio signal transmitter/receiver according to claim 1, characterized in that said first communication method is a TDMA method and can transmit and receive signals two kinds of modes in frequency bands different from each other.

10. The multi-band radio signal transmitter/receiver according to claim 1, characterized in that said second communication method is a CDMA method.

* * * * *